United States Patent
Jansen et al.

(10) Patent No.: US 8,211,513 B2
(45) Date of Patent: Jul. 3, 2012

(54) LIQUID-CRYSTALLINE COMPOUNDS AND LIQUID-CRYSTALLINE MEDIA

(75) Inventors: Axel Jansen, Darmstadt (DE); Helmut Haensel, Muehltal (DE); Philipp Krattiger, Darmstadt (DE); Andreas Taugerbeck, Darmstadt (DE); Malgorzata Rillich, Darmstadt (DE)

(73) Assignee: Merck Patent Gesellschaft mit Beschrankter Haftung, Darmstadt (DE)

( * ) Notice: Subject to any disclaimer, the term of this patent is extended or adjusted under 35 U.S.C. 154(b) by 0 days.

(21) Appl. No.: 13/053,479

(22) Filed: Mar. 22, 2011

(65) Prior Publication Data

US 2011/0233466 A1 Sep. 29, 2011

(30) Foreign Application Priority Data

Mar. 23, 2010 (DE) .................. 10 2010 012 329

(51) Int. Cl.
C09K 19/34 (2006.01)
C09K 19/12 (2006.01)
C07C 25/13 (2006.01)
C07C 43/225 (2006.01)
C07D 239/02 (2006.01)
C07D 309/02 (2006.01)
C07D 319/06 (2006.01)
C07D 211/84 (2006.01)

(52) U.S. Cl. ............... 428/1.1; 252/299.61; 252/299.66; 544/335; 546/346; 549/369; 549/380; 568/663; 570/127

(58) Field of Classification Search .............. 428/1.1; 252/299.61, 299.62, 299.63, 299.66; 544/335; 546/346; 549/369, 380; 568/663; 570/127
See application file for complete search history.

(56) References Cited

U.S. PATENT DOCUMENTS

| | | | |
|---|---|---|---|
| 7,105,210 B2 | 9/2006 | Heckmeier et al. | |
| 7,291,367 B2 | 11/2007 | Kirsch et al. | |
| 7,595,101 B2 | 9/2009 | Wittek et al. | |
| 7,704,566 B2 | 4/2010 | Heckmeier et al. | |
| 7,767,277 B2 | 8/2010 | Lietzau et al. | |
| 2009/0059157 A1 | 3/2009 | Haseba et al. | |
| 2010/0127213 A1 | 5/2010 | Czanta et al. | |
| 2010/0320420 A1 | 12/2010 | Hirschmann et al. | |
| 2011/0193022 A1* | 8/2011 | Tanaka et al. | 252/299.61 |
| 2011/0242473 A1* | 10/2011 | Haseba et al. | 349/139 |

FOREIGN PATENT DOCUMENTS

| | | |
|---|---|---|
| DE | 10353658 A1 | 6/2004 |
| DE | 102008016053 A1 | 10/2008 |
| DE | 10 2008 024 866 | 6/2009 |
| EP | 1454975 A2 | 9/2004 |
| EP | 1 900 792 | 3/2008 |
| EP | 1 908 811 | 4/2008 |
| WO | WO-2005 017067 | 2/2005 |
| WO | 2008061606 A1 | 5/2008 |
| WO | 2009139330 A1 | 11/2009 |
| WO | WO 2010017868 A1 * | 2/2010 |

OTHER PUBLICATIONS

European Search Report for EP11001822 dated Jun. 10, 2011.

* cited by examiner

*Primary Examiner* — Shean Wu
(74) *Attorney, Agent, or Firm* — Millen, White, Zelano & Branigan, P.C.

(57) ABSTRACT

The present invention relates to liquid-crystalline compounds having at least three fluorine-substituted benzene rings, a terminal trifluoromethyl group and at least one —$CF_2O$— bridge. The invention also relates to liquid-crystalline media prepared therewith and to liquid-crystal display devices (LC displays) containing these media.

22 Claims, No Drawings

LIQUID-CRYSTALLINE COMPOUNDS AND LIQUID-CRYSTALLINE MEDIA

The present invention relates to liquid-crystalline compounds having at least three fluorine-substituted benzene rings, a terminal trifluoromethyl group and at least one —$CF_2O$— bridge. The invention also relates to liquid-crystalline media prepared therewith and to liquid-crystal display devices (LC displays) containing these media.

Liquid-crystalline media have been used for some time in LC displays in order to display information. Highly polar compounds having 4 rings and one —$CF_2O$— bridge have already been proposed for display devices, for example in the specifications DE 10353658 A1 and EP 1454975 A2. The specification US 2009/0059157 A1 discloses LC displays which operate in the optically isotropic blue phase.

Besides the displays with nematic liquid crystals which are well known to the person skilled in the art, applications based on media having a blue phase are also increasingly being developed. These are distinguished by particularly short response times. In display applications in which electro-optical effects of the liquid-crystalline blue phases are utilised, the parameters $\Delta\epsilon$ and $\Delta n$, in particular, are of crucial importance.

The basis for the fast switching operations in these phases is the so-called Kerr effect. The Kerr effect is the change in birefringence of an optically transparent and isotropic material caused by an external electric field. The change in birefringence is given by the following equation:

$$\Delta n_{induced} = \lambda \cdot K \cdot E^2$$

where $\Delta n_{induced}$ is the induced birefringence, K is the Kerr constant, and E is the applied electric field. $\lambda$ represents the wavelength. Unusually high Kerr constants are observed for materials in the blue phase.

Kikuchi et al. describe the dependence of the Kerr constant on the LC material properties [H. Kikuchi et al., *Appl. Phys. Lett.* 2008, 92, 043119]. Accordingly, the Kerr constant is proportional to the product of birefringence and dielectric anisotropy of the liquid-crystalline medium:

$$K \sim \Delta n \cdot \Delta\epsilon$$

For fast switching processes and low switching voltages, materials having high values of the Kerr constant and thus high values of the product $\Delta n \cdot \Delta\epsilon$ are required.

Besides polymerisable cyclohexane derivatives for use for the stabilisation of blue phases, WO 2008/061606 also discloses a multiplicity of different LC components, including a $CF_3$-terminated compound of the following formula:

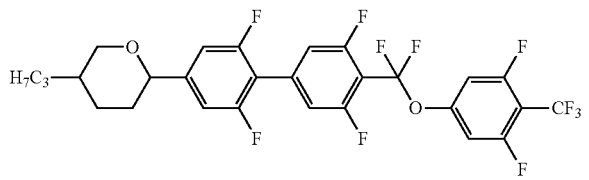

The benzene ring next to the tetrahydropyran ring here is substituted exclusively by two fluorine atoms.

The specification US 2006/0061699 A1 (cf. DE 10353685 A1) discloses compounds having 4 rings and one —$CF_2O$— bridge, including, for example, the two F-terminated compounds of the formula

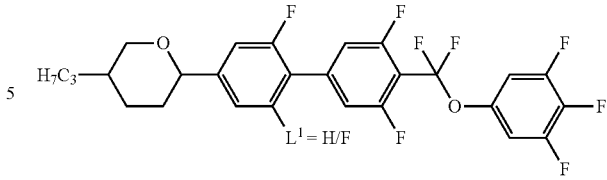

It is evident from the data for the compounds that the product $\Delta n \cdot \Delta\epsilon$ for the compound where $L^1$=H is less than for the compound where $L^1$=F (4.0 compared with 4.3).

The specification EP 1454975 A2 discloses compounds having 4 rings and one —$CF_2O$— bridge, including, for example, the two $OCF_3$-terminated compounds of the formula

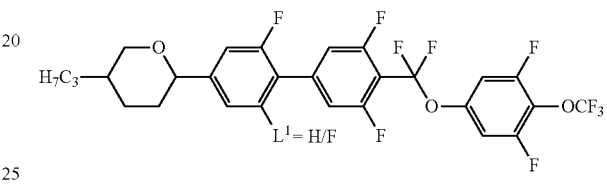

It is again evident from the data for the compounds that the product $\Delta n \cdot \Delta\epsilon$ for the compound where $L^1$=H is less than for the compound where $L^1$=F (3.5 compared with 3.7).

It is an object of the present invention to provide compounds having advantageous properties for use in liquid-crystalline media. In particular, they should be suitable for use in displays which use media having polymer-stabilised blue phases. Materials are required here which enable fast switching, have a good voltage holding ratio (VHR), require low voltages for the switching process ($V_{op}$), have high clearing points, exhibit low hysteresis, have a low memory effect and are stable to exposure to light and heat. In addition, the individual compounds should have adequate solubility in nematic LC media or themselves have a broad nematic phase range.

This object is achieved in accordance with the invention by compounds of the general formula I. Surprisingly, it has also been found that liquid-crystalline media having a suitable, nematic phase range, high dielectric anisotropy $\Delta\epsilon$ and high $\Delta n$ which do not have the disadvantages of the prior-art materials, or at least only do so to a considerably reduced extent, can be achieved with the compounds according to the invention. Substantially the same requirements are made of highly polar substances for purely nematic displays.

The invention relates to compounds of the formula I

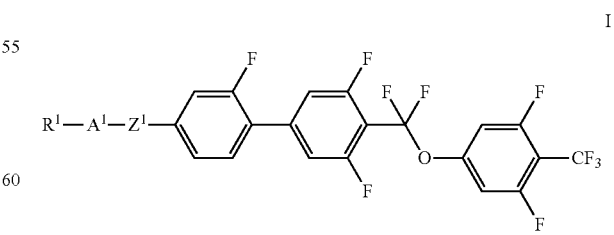

in which $A^1$ denotes 1,4-phenylene, which may optionally be up to tetrasubstituted, independently of one another, by halogen, CN, $CH_3$, $CHF_2$, $CH_2F$, $CF_3$, $OCH_3$, $OCHF_2$, OCH$_2$F or OCF$_3$ and in which 1-2 CH groups may optionally be substituted by N, cyclohexane-1,4-diyl or cyclohexene-1,4-diyl, in each of which 1-2 CH$_2$ groups may optionally be substituted, independently of one another, by O or S and/or H may be substituted by F, bicyclo[1.1.1]pentane-1,3-diyl, bicyclo[2.2.2]octane-1,4-diyl, spiro[3.3]heptane-2,6-diyl, tetrahydropyran-2,5-diyl, 1,3-dioxane-2,5-diyl, 2,5-thiophenediyl or 2,5-selenophenediyl, $Z^1$ denotes a single bond, CF$_2$O, CH$_2$CH$_2$, CF$_2$CH$_2$, CF$_2$CF$_2$, CFHCFH, CFHCH$_2$, (CO)O, CH$_2$O, C≡C, CH=CH, CF=CH, CF=CF; where asymmetrical bonding units (for example CF$_2$O) may be oriented in both possible directions, and $R^1$ denotes an unsubstituted alkyl radical having 1 to 15 C atoms, where, in addition, one or more CH$_2$ groups in this radical may each be replaced, independently of one another, by —CH=CH—, —CF=CF—, —CF=CH—, —CH=CF—, —(CO)O—, —O(CO)—, —(CO)— or —O— in such a way that O atoms are not linked directly to one another, H, F, Cl, Br, CN, CF$_3$, OCF$_3$, SCN, NCS or SF$_5$.

The compounds according to the invention have a relatively high clearing point, extremely high dielectric anisotropy (Δε), high optical anisotropy (Δn) and low rotational viscosity. They have, alone or mixed with further mesogenic components, a nematic phase over a broad temperature range. These properties make them suitable for use in liquid-crystalline media. They are particularly suitable for use in media in the region of the blue phase.

The radical $R^1$ preferably denotes an alkyl radical having 1 to 15 C atoms, where, in addition, one or more CH$_2$ groups in this radical may each be replaced, independently of one another, by —CH=CH—, —(CO)O—, —O(CO)—, —(CO)— or —O— in such a way that O atoms are not linked directly to one another. $R^1$ particularly preferably denotes an unsubstituted alkyl and very particularly preferably a straight-chain alkyl having 1 to 12 C atoms.

The bridging group $Z^1$ preferably denotes a single bond.

The ring $A^1$ preferably denotes a group selected from the radicals

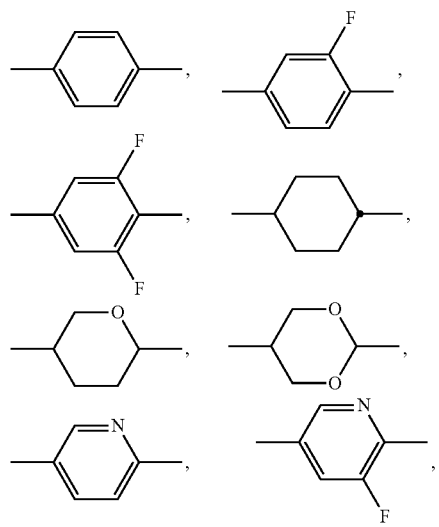

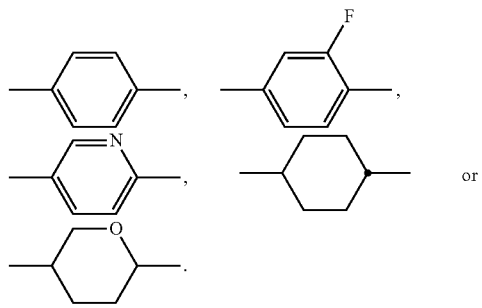

particularly preferably selected from the radicals

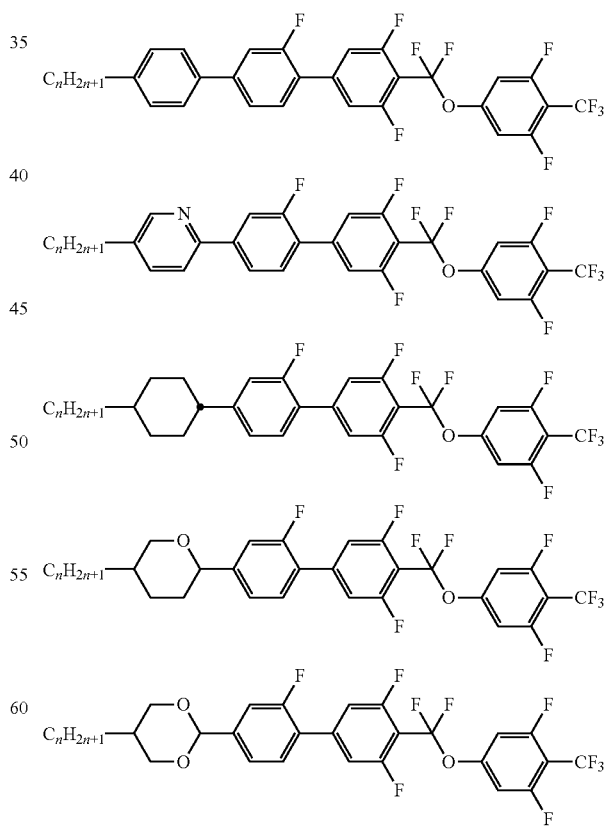

Illustrative preferred embodiments of the invention are therefore, inter alia, the following structures:

in which n=1, 2, 3, 4, 5, 6 or 7, in particular 3.

The compounds of the formula I can advantageously be prepared as evident from the following illustrative synthesis (Scheme 1):

The compounds of the formula I are particularly preferably prepared by a palladium-promoted cross-coupling reaction of the building blocks 2 with boronic acids 1 or boronic acid esters, such as, for example, 3 (Suzuki coupling, cf. Scheme 1).

Scheme1: Synthesis of the compounds I using the building blocks 2

Method A: Use of boronic acids 1

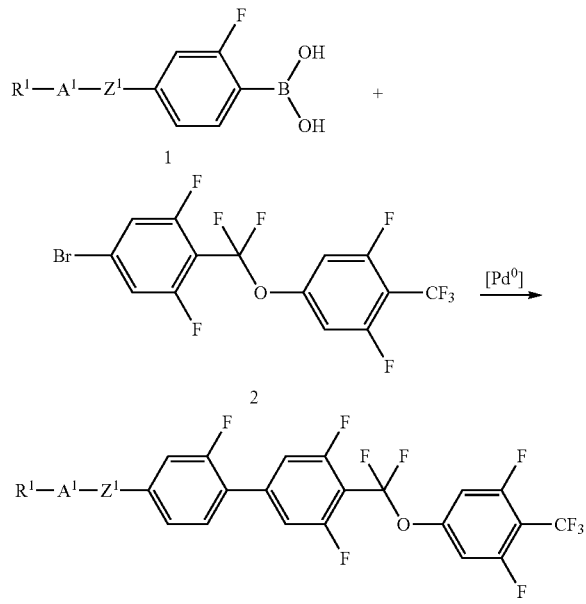

Method B: Use of boronic acid esters, e.g. pinacolboronic acid esters 3

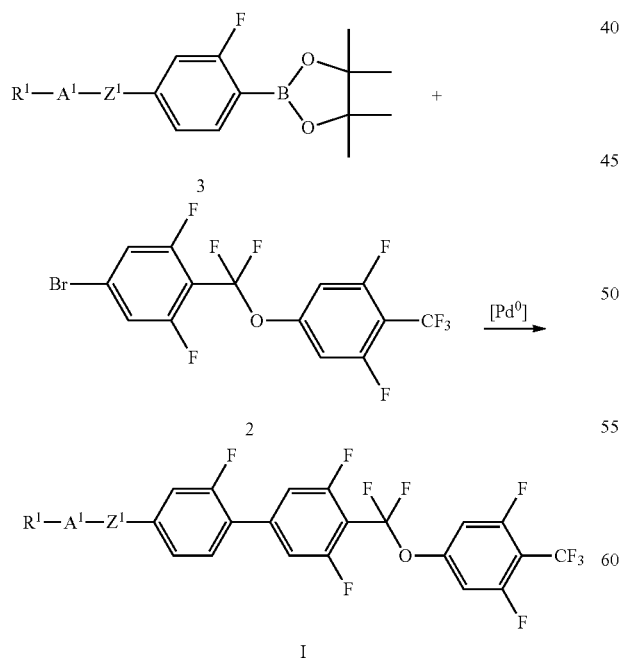

The roles of electrophile and nucleophile may also be exchanged. The boronic acids 6 or boronic acid esters, such as, for example, the pinacol boronic acid ester 5, are then preferred starting compounds (Scheme 2). These are reacted with corresponding electrophiles 4, where X is preferably Br, I or triflate (OTf).

Scheme 2: Synthesis of the compounds I using the building blocks 4 or 5

Method C: Use of boronic acid esters, e.g. pinacolboronic acid ester 5

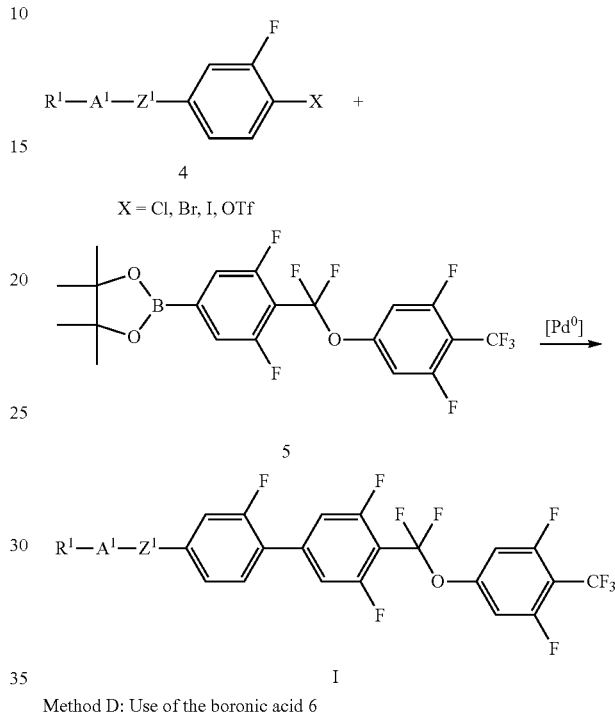

Method D: Use of the boronic acid 6

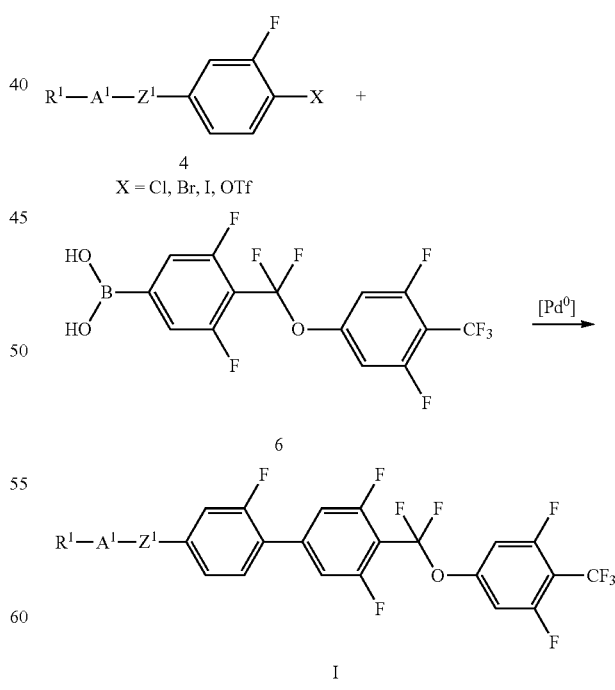

The starting materials required can be prepared analogously to processes which are known to the person skilled in the art and are described in standard works of organic chemistry, such as, for example, in Houben-Weyl, Methoden der organischen Chemie [Methods of Organic Chemistry], Thieme-Verlag, Stuttgart.

Compound 2 is, as shown in Scheme 3, synthesised starting from 3,5-difluoro-4-trifluoromethylphenol (8). The phenol is reacted with the dithianylium salt 7 in the presence of base, and the adduct is subjected directly to oxidative desulfuration [P. Kirsch, M. Bremer, A. Taugerbeck, T. Wallmichrath, *Angew. Chem. Int. Ed.* 2001, 40, 1480-1484].

Scheme 3: Synthesis of the compound 2

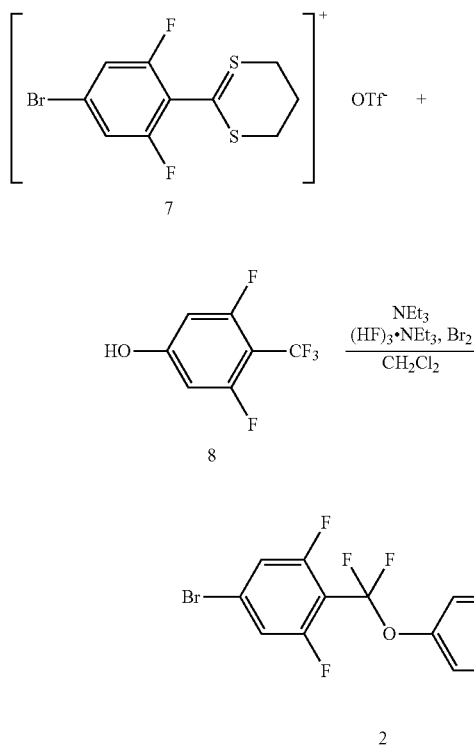

The boronic acid ester 5 is then obtained starting from 2 via a palladium-catalysed borylation using pinacolboranes, for example bis(pinacolato)-diboron (Pin$_2$B$_2$). The boronic acid 6 is obtained by reaction of the organo-lithium compound obtained from 2 with trimethyl borate and subsequent hydrolysis (Scheme 4).

Scheme 4: Synthesis of the compounds 5 and 6

Palladium-catalysed borylation

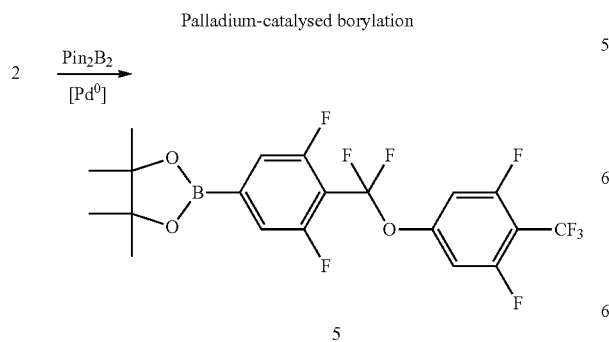

-continued

Synthesis of the boronic acid 6 using trimethyl borate

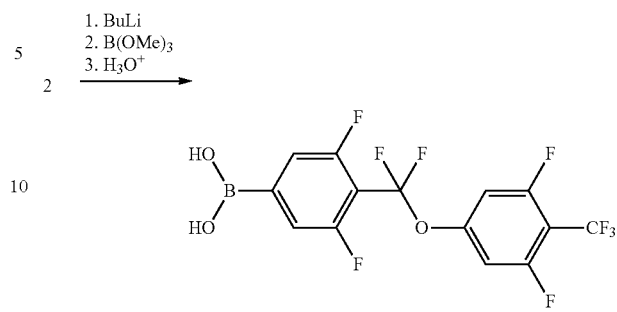

If A$^1$ is a cyclohexane ring and Z$^1$ is a single bond, method A (cf. Scheme 1) is then preferably used, since the corresponding boronic acids 13 are readily accessible (Scheme 5). The Grignard reagent obtained from 3-fluorobromophenol (9) is added onto ketones 10. The alcohols 11 are converted into the alkenes with elimination of water, and these are then hydrogenated. Isomerisation preferably then gives the trans isomers of the compounds 12. An ortho-metallation at the desired position succeeds with a suitable lithium base. The organometallic compound is reacted with trimethyl borate, and the boronic acids 13 are obtained after work-up using acid.

The Suzuki coupling of components 13 and 2 then proceeds, for example under the conditions described in Scheme 5, in excellent yields.

Scheme 5: Synthesis of the compounds Ib in which A$^1$ is a cyclohexane ring and Z$^1$ is a single bond Synthesis of the boronic acids 13

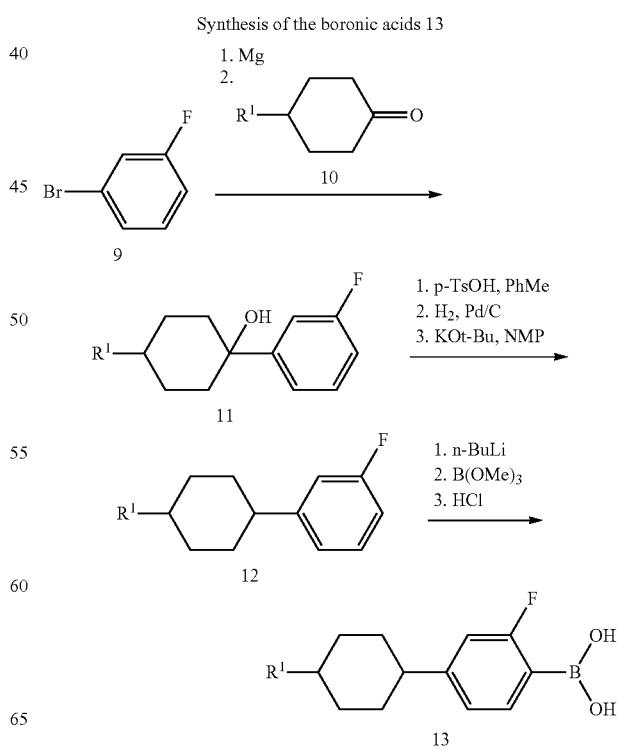

-continued
Suzuki coupling

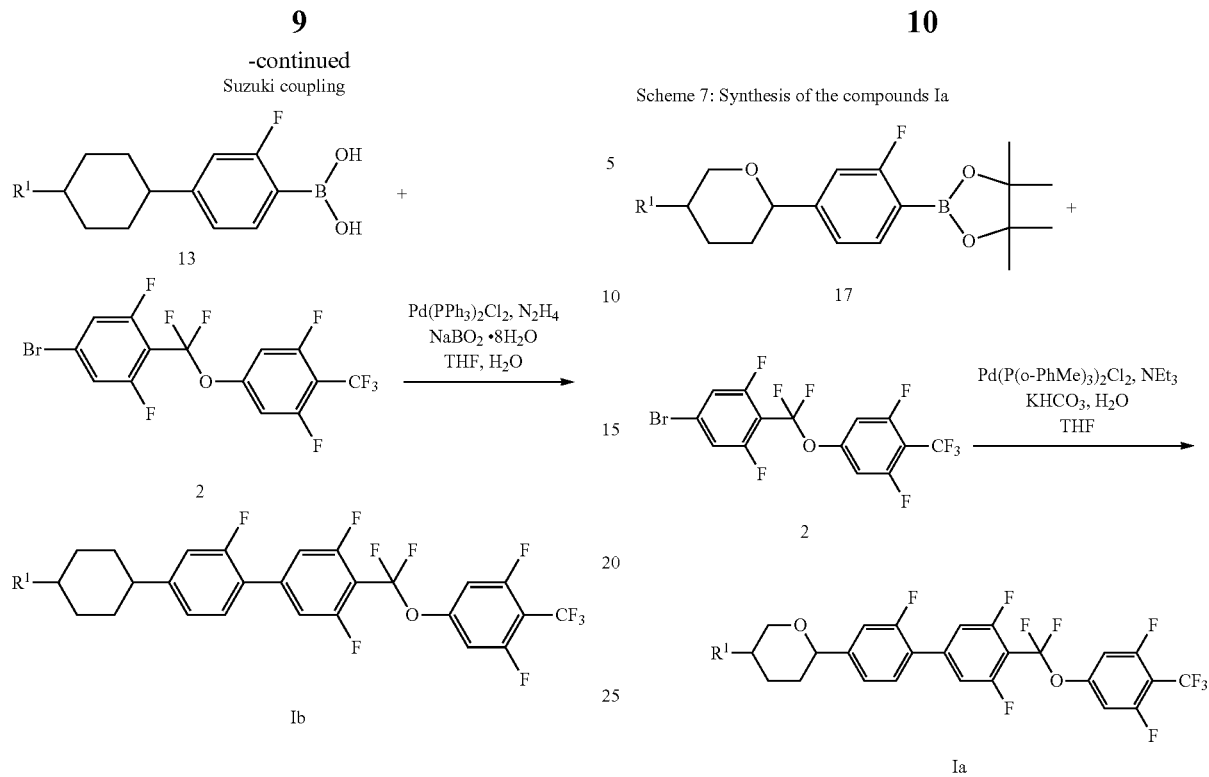

Scheme 7: Synthesis of the compounds Ia

For compounds in which $A^1$ represents a tetrahydropyran ring, this is not a preferred process since mixtures of regioisomeric boronic acids are obtained if a reaction is carried out analogously (cf. Scheme 6). Separation of 15 and 16 is not readily possible.

Scheme 6: Formation of a regioisomeric mixture in the synthesis of the boronic acid 15

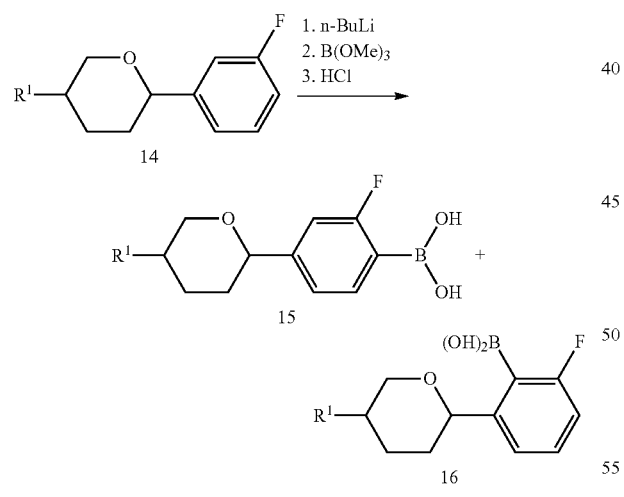

It is therefore also an aspect of this invention to provide processes in order to be able to synthesise the preferred compounds Ia (=I where $A^1$=tetrahydropyran and $Z^1$=single bond) in good yields and excellent purity. This object is achieved by the development of two processes (cf. Schemes 7 and 8 or Schemes 9 and 10).

A first process is based on method B from Scheme 1. The boronic acid ester 17 is converted here into the compounds Ia in a Suzuki coupling to the compound 2 (Scheme 7).

The boronic acid ester 17 required for this purpose is synthesised starting from 4-bromo-3-fluorobenzaldehyde (18). This is firstly reacted with the allyl alcohols 19 in a Prins-type cyclisation to give the bromotetrahydropyrans 20. These are reacted with $Pin_2B_2$ with palladium catalysis to give the boronic acid esters 21. Finally, a debromination is carried out to give the compounds 17 under reductive conditions.

Scheme 8: Synthesis of the boronic acid ester 17

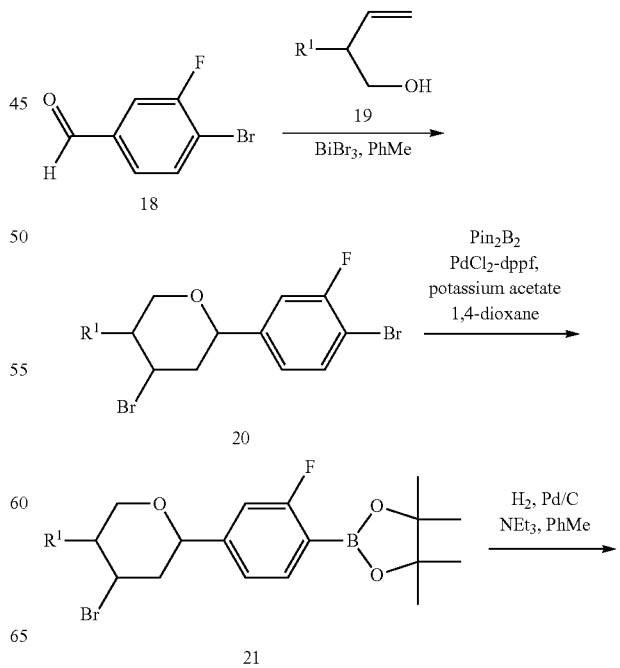

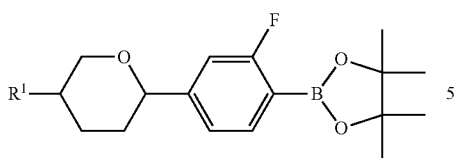

17

A second process is based on method C from Scheme 2. Here, the triflates 22 are used as starting materials and reacted with the boronic acid ester 5 in a Suzuki coupling to give the compounds Ia (Scheme 9).

Scheme 9: Synthesis of the compounds Ia

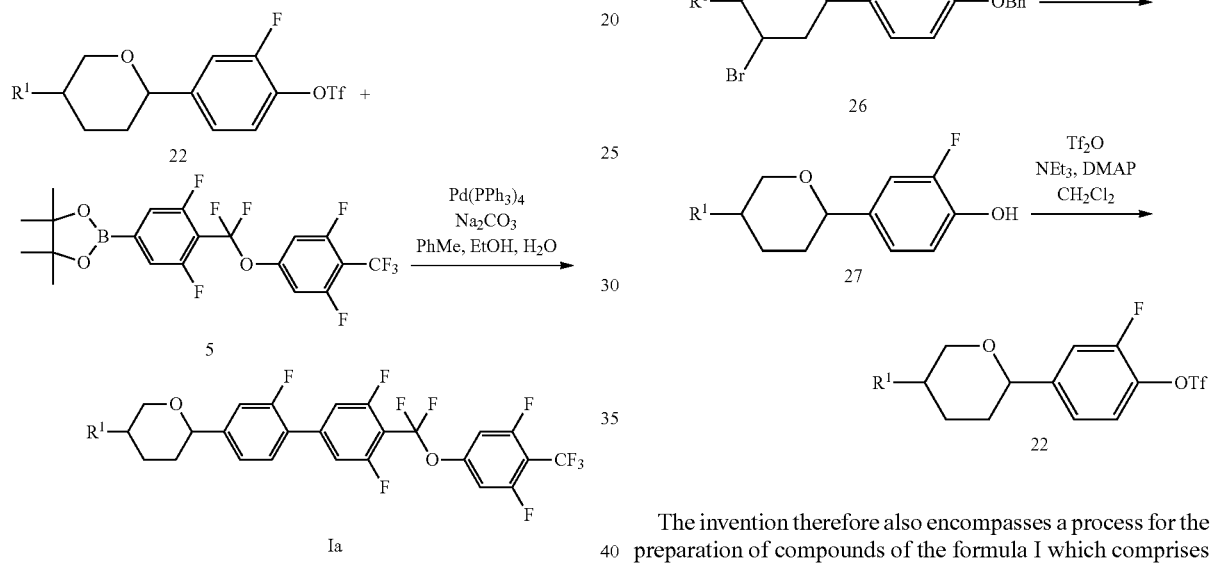

The triflates 22 are synthesised as follows, starting from 4-bromo-2-fluorophenol (23). Firstly, the hydroxyl function is protected using benzyl bromide, giving the benzyl ether 24. The Grignard reagent formed from 24 is formylated using N-formylmorpholine or DMF. The tetrahydropyran ring is built up via the Prins-type cyclisation of the aldehyde 25 using allyl alcohols 19. The undesired cis isomers of the compounds 26 (with respect to the 1,4-positions of the tetrahydropyran ring) are advantageously separated off at this stage. The debromination under reductive conditions is accompanied by removal of the benzyl protecting group, with formation of the phenols 27. Reaction of the compounds 27 with trifluoromethanesulfonic anhydride (Tf$_2$O) gives the desired triflates 22.

Scheme 10: Synthesis of the triflates 22

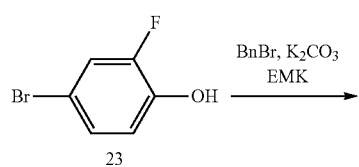

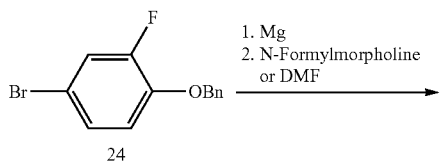

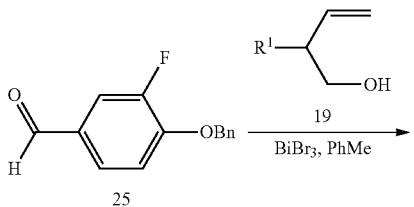

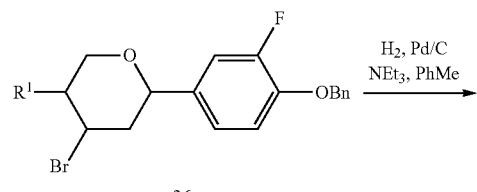

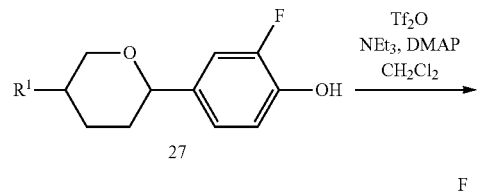

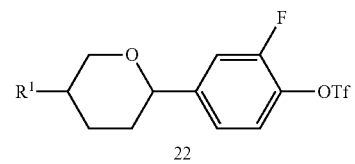

The invention therefore also encompasses a process for the preparation of compounds of the formula I which comprises a reaction step in which two starting materials of the formulae A and B:

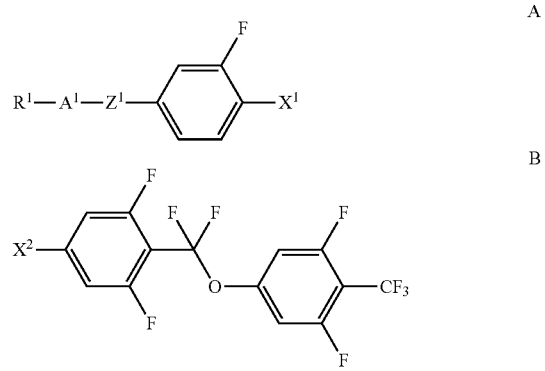

in which R$^1$, A$^1$ and Z$^1$ are as defined for formula I, and

X$^1$ or X$^2$ denotes —B(OH)$_2$, a boronic acid ester or a boronate salt, and the other radical denotes Cl, Br, I or —O(SO$_2$)CF$_3$, are reacted in the presence of a suitable transition-metal catalyst.

The process is particularly advantageous for compounds of the formula I in which A¹ denotes

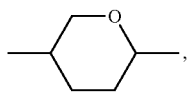

Z¹ denotes a single bond,

X¹ denotes a radical which includes a boron atom, preferably a boronic acid ester group, and X² denotes a halogen or a group which is suitable for the process.

The boron compound A is preferably prepared analogously to Scheme 8, i.e. the compound A or a precursor thereof is prepared from a compound where X¹=Br with palladium catalysis in the presence of a suitable boron compound.

The liquid-crystalline media in accordance with the present invention comprise one or more compounds of the formula I and optionally at least one further, preferably mesogenic compound. The liquid-crystal media therefore preferably comprise two or more compounds. Preferred media comprise the preferred compounds of the formula I.

The liquid-crystalline media according to the invention preferably have positive dielectric anisotropy. They can be designed in such a way that they have very high dielectric anisotropy combined with high optical anisotropy.

Preferred further compounds for the liquid-crystalline media in accordance with the invention are selected from the compounds of the formulae II and III:

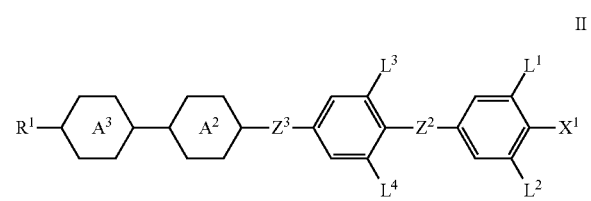

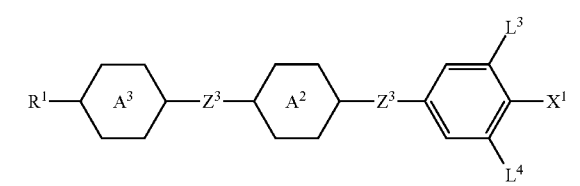

in which

R¹ in each case, independently of one another, denotes an unsubstituted alkyl radical having 1 to 15 C atoms, where, in addition, one or more CH₂ groups in this radical may each be replaced, independently of one another, by —C≡C—, —CH=CH—, —CF=CF—, —CF=CH—, —CH=CF—, —(CO)O—, —O(CO)—, —(CO)— or —O— in such a way that O atoms are not linked directly to one another, preferably a straight-chain alkyl radical having 2 to 7 C atoms, A², A³, independently of one another, denote

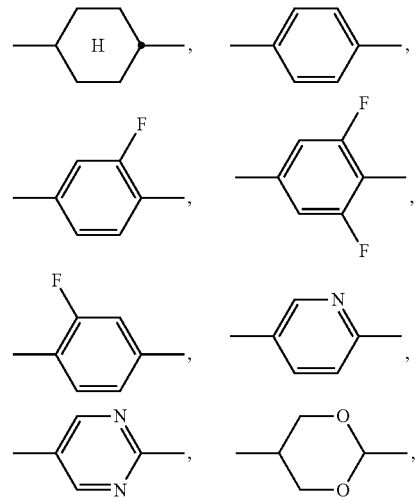

Z², Z³, independently of one another, denote a single bond, CF₂O, CH₂CH₂, CF₂CH₂, CF₂CF₂, CFHCFH, CFHCH₂, (CO)O, CH₂O, C≡C, CH=CH, CF=CH, CF=CF, where asymmetrical bonding units (for example CF₂O) may be oriented in both possible directions, X¹ denotes F, Cl, CN, or alkyl, alkenyl, alkenyloxy, alkylalkoxy or alkoxy having 1 to 3 C atoms, which is mono- or polysubstituted by F, and L¹ to L⁴ denote H or F.

The liquid-crystalline media preferably comprise between 10 and 50% by weight of compounds of the formula I. In the case of a total content of more than 10%, two or more compounds of the formula I with different chain lengths in the radical R¹ and optionally with different rings A¹ are preferably employed.

The liquid-crystalline media preferably comprise between 20 and 40% by weight of compounds of the formula II. The compounds of the formula III are preferably, if present, employed in amounts of up to 20% by weight. The remaining other compounds, if present, are selected from further compounds having high dielectric anisotropy, high optical anisotropy and preferably a high clearing point.

Disproportionately high dielectric anisotropies can be achieved by a high content of the compounds of the formula I, preferably supplemented by compounds of the formulae II and III.

Preferred compounds of the formula II are those of the formula IIa:

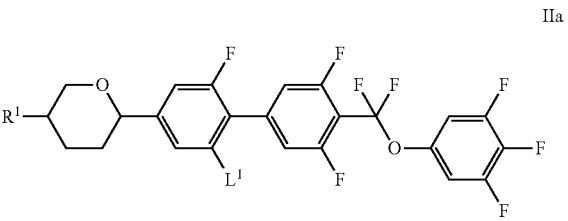

in which R¹ and L¹ are as defined for formula II.

Preferred compounds of the formula III are those of the formula IIIa or IIIb:

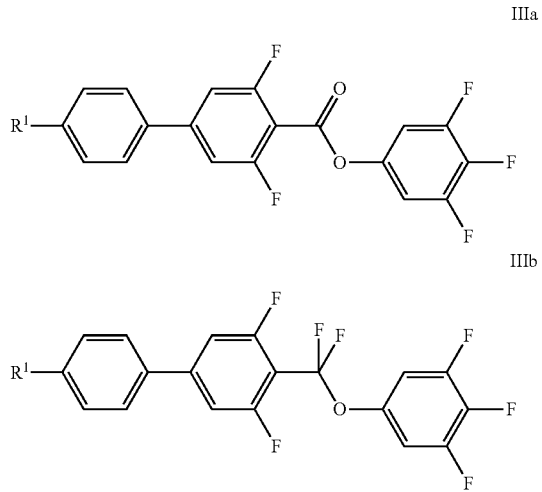

in which $R^1$ is as defined for formula III.

The invention furthermore relates to the use of the compounds of the formula I in liquid-crystalline media, preferably in media having an optically isotropic liquid-crystalline phase, preferably a blue phase. This phase is preferably polymer-stabilised. In general, the monomer content of the medium is polymerised at a temperature at which it is in the blue phase. The stability range of this phase is thus broadened. A considerable improvement in the hitherto achievable properties of the polymer-stabilised media in the blue phase is associated with the compounds and media according to the invention.

The liquid-crystalline media may in addition comprise further additives, such as stabilisers, chiral dopants and nanoparticles. The individual compounds added are employed in concentrations of preferably 0.1 to 6%. The concentrations of the individual compounds used are preferably in each case in the range from 0.1% to 3%. However, the concentration data for the other constituents of the liquid-crystal mixtures, i.e. the liquid-crystalline or mesogenic compounds and if appropriate the polymerisation components, are indicated without taking into account the concentration of these additives.

The liquid-crystalline media preferably comprise 0.01 to 10% by weight of an optically active, chiral dopant. This supports the formation of a liquid-crystalline blue phase. For blue phases, chiral dopants having a high HTP ('helical twisting power') are preferably employed, typically in the range 2-5% by weight.

The media according to the invention preferably comprise one or more polymerisable compounds or are stabilised by a polymer obtained therefrom, where the polymerisation is preferably carried out in the blue phase.

The liquid-crystalline media preferably comprise 0 to 10% by weight, in particular 0.01 to 5% by weight and particularly preferably 0.1 to 3% by weight, of stabilisers. The media preferably comprise one or more stabilisers selected from 2,6-di-tert-butylphenols, 2,2,6,6-tetramethylpiperidines or 2-benzotriazol-2-ylphenols. These assistants are known to the person skilled in the art and are commercially available, for example as light stabilisers.

An embodiment of the invention is therefore also a process for the preparation of a liquid-crystal medium which is characterised in that one or more compounds of the formula I are mixed with one or more liquid-crystalline compounds, preferably selected from the formulae II and III, optionally with one or more further compounds and optionally with one or more additives. The polymerisable content of the liquid-crystalline medium is optionally subsequently polymerised.

The present invention furthermore relates to the use of the compounds or media according to the invention in an electro-optical device, preferably a liquid-crystal display, and to such devices themselves. The displays preferably operate at least partly in the region of the blue phase, which is preferably a polymer-stabilised blue phase. The media and displays alternatively also preferably operate in the nematic phase.

A polymer-stabilised device according to the invention is preferably produced by carrying out the polymerisation of the polymerisable constituents of the medium in the device itself, i.e. in the opto-electronic cell.

The structure of the electro-optical display device according to the invention preferably consists of a cell comprising two substrates opposite one another which enclose the liquid-crystalline medium, and of electrodes mounted in the cell. The electrodes are preferably designed in such a way that they are able to generate an electric field which has a component aligned parallel to the substrates (or perpendicular to the light axis) in the liquid-crystalline medium. The electrodes are preferably applied to one of the substrates as comb electrodes (interdigital electrodes). It is preferred for one or both substrates to be transparent. In the case of displays which operate in the blue phase, the optically isotropic medium becomes birefringent through the application of a voltage. An optical switching operation is achieved together with correspondingly arranged polarisers.

In the present application, the term dielectrically positive describes compounds or components where $\Delta\epsilon > 3.0$, dielectrically neutral describes compounds or components where $-1.5 \leq \Delta\epsilon \leq 3.0$, and dielectrically negative describes compounds or components where $\Delta\epsilon < -1.5$. The dielectric anisotropy of the respective compound is determined from the results of a solution of 10% of the respective individual compound in a nematic host mixture. If the solubility of the respective compound in the host mixture is less than 10%, the concentration is reduced to 5%. The capacitance of the test mixtures is determined both in a cell with homeotropic alignment and also in a cell with homogeneous alignment. The layer thickness in both cell types is about 20 μm. The applied voltage is a rectangular wave having a frequency of 1 kHz and an effective value of typically 0.5 V to 1.0 V, but is always selected so that it is below the capacitive threshold for the respective test mixture.

The host mixture used for dielectrically positive compounds is mixture ZLI-4792 and the host mixture used for dielectrically neutral and dielectrically negative compounds is mixture ZLI-3086, both from Merck KGaA, Germany. The absolute values of the dielectric constants of the compounds are determined from the change in the respective values of the host mixture on addition of the compounds of interest. The values are extrapolated to a concentration of the compounds of interest of 100%.

Components which have a nematic phase at the measurement temperature of 20° C. are measured as such, all others are treated like compounds.

The parameter ranges indicated in this application all include the limit values, unless expressly indicated otherwise.

Throughout the application, unless expressly indicated otherwise, the following conditions and definitions apply. All concentrations are indicated in percent by weight and in each case relate to the mixture as a whole. All temperatures, such as, for example, the melting point T(C,N) or T(C,S), the transition from the smectic phase (S) to the nematic phase (N) T(S,N) and the clearing point T(N,I), of the liquid crystals are indicated in degrees Celsius. All temperature differences are indicated in differential degrees. All physical properties which are typical of liquid crystals are determined in accordance with "Merck Liquid Crystals, Physical Properties of Liquid Crystals", status November 1997, Merck KGaA, Germany, and are shown for a temperature of 20° C., unless expressly indicated otherwise. The optical anisotropy (Δn) is determined at a wavelength of 589.3 nm. The dielectric anisotropy (ΔЄ) is determined at a frequency of 1 kHz. ΔЄ is defined as $(Є_\parallel - Є_\perp)$, while $Є_{ave.}$ is $(Є_\parallel + 2Є_\perp)/3$.

The threshold voltages and all other electro-optical properties are determined using test cells produced at Merck KGaA, Germany. The test cells for the determination of ΔЄ have a layer thickness of about 20 nm. The electrode is a circular ITO electrode having an area of 1.13 cm² and a protective ring. The alignment layers are SE-1211 from Nissan Chemicals, Japan, for homeotropic alignment $(Є_\parallel)$ and polyimide AL-1054 from Japan Synthetic Rubber, Japan, for homogeneous alignment $(Є_\parallel)$. The capacitance values are determined using a Solatron 1260 frequency response analyser using a sine wave with a voltage of 0.3 $V_{rms}$. The light used in the electro-optical measurements is white light. A set-up with a commercially available DMS instrument from Autronic-Melchers, Germany, is used here. The characteristic voltages are determined with perpendicular observation. The threshold voltage ($V_{10}$), mid-grey voltage ($V_{50}$) and saturation voltage ($V_{90}$) are determined for a relative contrast of 10%, 50% and 90% respectively.

The values for the components of the properties perpendicular and parallel to the director of the liquid crystal are obtained by alignment of the liquid crystal in a magnetic field. For this purpose, the magnetic field of a permanent magnet is used. The strength of the magnetic field is 0.35 tesla. The alignment of the magnet is set correspondingly and then rotated correspondingly through 90°.

In the present application, unless expressly indicated otherwise, the term compounds denotes both one compound and also a plurality of compounds.

The term "alkyl" preferably encompasses straight-chain and branched alkyl groups having 1 to 15 carbon atoms, in particular the straight-chain groups methyl, ethyl, propyl, butyl, pentyl, hexyl and heptyl. Groups having 2 to 10 carbon atoms are generally preferred.

The term "alkenyl" preferably encompasses straight-chain and branched alkenyl groups having 2 to 15 carbon atoms, in particular the straight-chain groups. Particularly preferred alkenyl groups are $C_2$- to $C_7$-1E-alkenyl, $C_4$- to $C_7$-3E-alkenyl, $C_5$- to $C_7$-4-alkenyl, $C_6$- to $C_7$-5-alkenyl and $C_7$-6-alkenyl, in particular $C_2$- to $C_7$-1E-alkenyl, $C_4$- to $C_7$-3E-alkenyl and $C_5$- to $C_7$-4-alkenyl. Examples of further preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The term "alkoxy" preferably encompasses straight-chain radicals of the formula $C_nH_{2n+1}$—O—, in which n denotes 1 to 10. n is preferably 1 to 6. Preferred alkoxy groups are, for example, methoxy, ethoxy, n-propoxy, n-butoxy, n-pentoxy, n-hexoxy, n-heptoxy, n-octoxy, n-nonoxy, n-decoxy.

The term "oxaalkyl" or "alkoxyalkyl" preferably encompasses straight-chain radicals of the formula $C_nH_{2n+1}$—O—$(CH_2)_m$, in which n and m each, independently of one another, denote 1 to 10. Preferably, n is 1 and m is 1 to 6.

The term "fluorinated alkyl radical" preferably encompasses mono- or polyfluorinated radicals. Perfluorinated radicals are included. Particular preference is given to $CF_3$, $CH_2CF_3$, $CH_2CHF_2$, $CHF_2$, $CH_2F$, $CHFCF_3$ and $CF_2CHFCF_3$.

The term "fluorinated alkoxy radical" preferably encompasses mono- or polyfluorinated radicals. Perfluorinated radicals are included. Particular preference is given to $OCF_3$.

1,4-Cyclohexane rings are preferably in the 1,4-trans configuration. The example compounds are in the trans configuration.

In the present application, the term "compounds", unless explicitly indicated otherwise, denotes both one compound and also a plurality of compounds. Conversely, the term "compound" generally also includes a plurality of compounds, if this is possible according to the definition and is not indicated otherwise. The same applies to the terms liquid-crystalline media and liquid-crystalline medium. The term "component" in each case encompasses one or more substances, compounds and/or particles.

The liquid-crystal media according to the invention consist of a plurality of compounds, preferably 3 to 30, more preferably 4 to 20 and very preferably 4 to 16 compounds. These compounds are mixed in a conventional manner. In general, the desired amount of the compound used in lesser amount is dissolved in the compound used in greater amount. If the temperature is above the clearing point of the compound used in higher concentration, the completion of the dissolution process is particularly easy to observe. However, it is also possible to prepare the media in other conventional ways, for example using so-called premixes, which may be, for example, homologous or eutectic mixtures of compounds, or using so-called "multi-bottle" systems, whose constituents are themselves ready-to-use mixtures.

The following examples explain the present invention without restricting it in any way.

However, the physical properties make it clear to the person skilled in the art what properties can be achieved and in what ranges they can be modified. In particular, the combination of the various properties which can preferably be achieved is thus well defined for the person skilled in the art.

Further abbreviations:

BnBr benzyl bromide

THF tetrahydrofuran

Pd/C commercially available catalyst with palladium on activated carbon support

DMAP 4-dimethylaminopyridine

MTBE methyl tert-butyl ether $SiO_2$ silica gel for chromatography

EXAMPLES

Example 1

2-{4'-[(3,5-Difluoro-4-trifluoromethylphenoxy)difluoromethyl]-2,3',5'-trifluorobiphenyl-4-yl}-5-propyltetrahydropyran

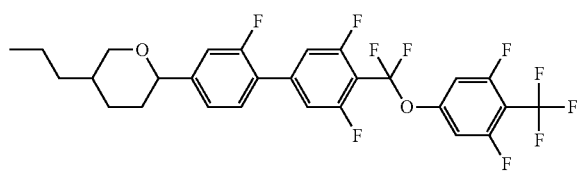

The compound according to the invention is prepared as described below:

1.1 Synthesis of 1-benzyloxy-4-bromo-2-fluorobenzene

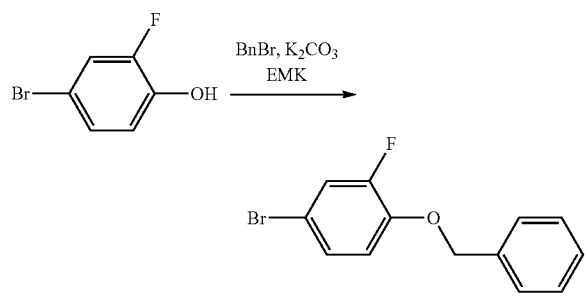

210.0 g (1.10 mol) of 4-bromo-2-fluorophenol are dissolved in 1.1 l of ethyl methyl ketone, and 175.0 g (1.27 mol) of potassium carbonate and 150.0 ml (1.26 mol) of benzyl bromide are added. The mixture is refluxed for 5 h and stirred at room temperature for 16 h. The batch is filtered, and the filtrate is concentrated to dryness. The crude product is crystallised from heptane at reduced temperature.

1.2 Synthesis of 4-benzyloxy-3-fluorobenzaldehyde

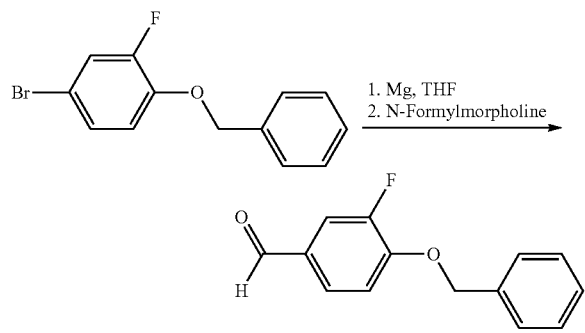

25.9 g (1.07 mol) of magnesium turnings are initially introduced in 200 ml of THF, and a solution of 285.6 g (1.02 mol) of 1-benzyloxy-4-bromo-2-fluorobenzene in 700 ml of THF is added dropwise at such a rate that a gentle reflux is maintained after initiation of the Grignard reaction. When the addition is complete, the mixture is diluted with 1000 ml of THF, and the batch is heated at the boil for 1 h. The solution of the Grignard reagent is cooled to 0° C., and 118 ml (1.07 mol) of N-formylmorpholine in 100 ml of THF are added dropwise. After 1 h, the mixture is diluted with MTBE and hydrolysed using dilute hydrochloric acid. The organic phase is separated off, and the aqueous phase is extracted with MTBE. The combined organic phases are washed with saturated sodium chloride solution and dried using sodium sulfate. The solution is concentrated to dryness, and the crude product is recrystallised from n-heptane:MTBE.

1.3 Synthesis of 2-(4-benzyloxy-3-fluorophenyl)-4-bromo-5-propyltetrahydropyran

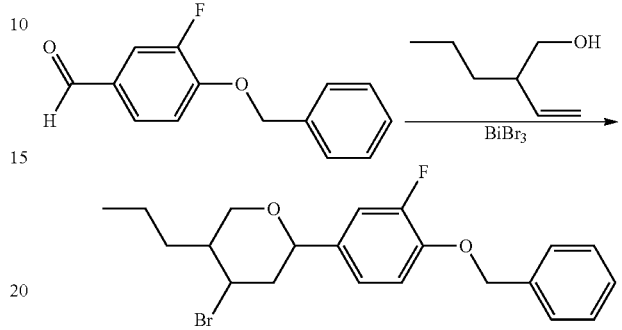

188.0 g (0.79 mol) of 4-benzyloxy-3-fluorobenzaldehyde are initially introduced in 1000 ml of dichloromethane at 0° C. together with 90.0 g (0.79 mol) of 2-vinylpentan-1-ol. 176.0 g (0.39 mol) of bismuth(III) bromide are added in portions, and the mixture is stirred at room temperature for 19 h. Insoluble constituents are separated off, and the mixture is filtered absorptively ($SiO_2$, $CH_2Cl_2$). The filtrate is concentrated to dryness, and the residue is purified by column chromatography ($SiO_2$, n-heptane:MTBE=4:1). The oil obtained is taken up in chlorobutane, and the solution is added dropwise to cold ethanol. The crystals which deposit are collected and recrystallised again from n-heptane. In this way, 2-(4-benzyloxy-3-fluorophenyl)-4-bromo-5-propyltetrahydropyran is obtained as a yellowish solid.

1.4 Synthesis of 2-fluoro-4-(5-propyltetrahydropyran-2-yl)phenol

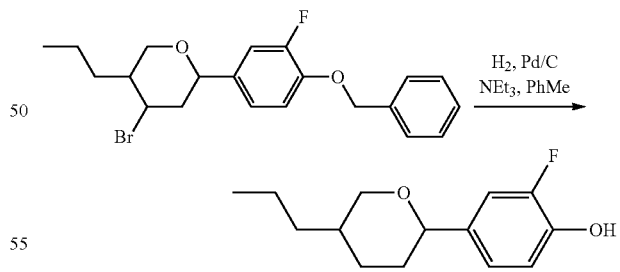

123.0 g (0.30 mol) of 2-(4-benzyloxy-3-fluorophenyl)-4-bromo-5-propyltetrahydropyran are hydrogenated in toluene/water in the presence of Pd/C (5% of Pd) and 86.0 ml (0.60 mol) of triethylamine. The reaction solution is diluted with MTBE, and the organic phase is separated off. The aqueous phase is extracted with MTBE. The combined organic phases are washed with water and dried using sodium sulfate. The solution is concentrated to dryness, and the residue is used directly for the following reaction.

1.5 Synthesis of 2-fluoro-4-(trans-5-propyltetrahydropyran-2-yl)phenyl trifluoromethanesulfonate

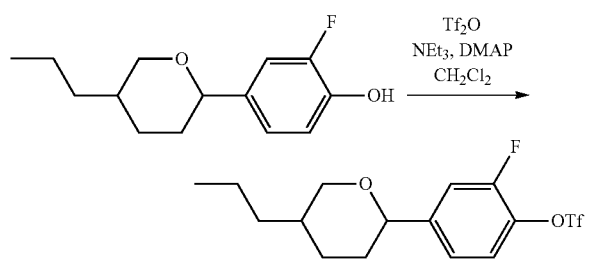

62.0 g (0.26 mol) of 2-fluoro-4-(5-propyltetrahydropyran-2-yl)phenol are initially introduced in 600 ml of dichloromethane at 0° C. together with 55.0 ml (0.40 mol) of triethylamine and 0.65 g (5.32 mmol) of DMAP. 45.0 ml (0.27 mol) of trifluoromethanesulfonic anhydride (Tf₂O) are metered in, and the mixture is stirred at room temperature for 17 h. The batch is washed with water, and the aqueous phase is extracted with dichloromethane. The combined organic phases are dried using sodium sulfate, and the solution is concentrated to dryness. The residue is purified by column chromatography, giving 2-fluoro-4-(trans-5-propyltetrahydropyran-2-yl)phenyl trifluoromethanesulfonate as a colourless liquid.

1.6 Synthesis of 2-{4'-[(3,5-difluoro-4-trifluoromethylphenoxy)difluoromethyl]-2',3',5'-trifluorobiphenyl-4-yl}-5-propyltetrahydropyran

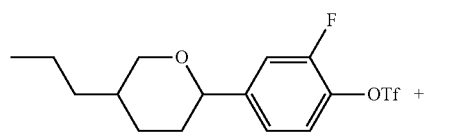

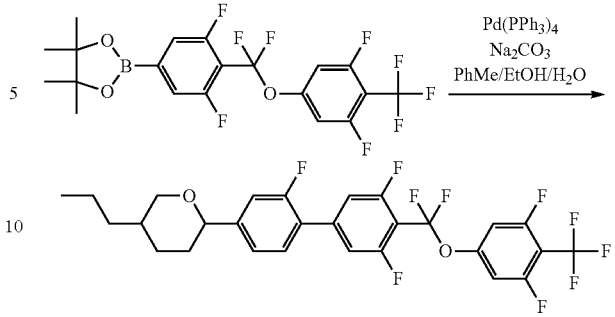

A mixture of 10.0 g (27.0 mmol) of 2-fluoro-4-(trans-5-propyltetrahydropyran-2-yl)phenyl trifluoromethanesulfonate and 14.3 g (29.4 mmol) of 2-{4-[(3,5-difluoro-4-trifluoromethylphenoxy)difluoromethyl]-3,5-difluorophenyl}-4,4,5,5-tetramethyl-1,3,2-dioxaborolan, 1.50 g (1.30 mmol) of tetrakis(triphenylphosphine)palladium (0) and 30 ml of 2 N sodium carbonate solution in 100 ml of toluene/ethanol (1:1) is heated under reflux for 20 h. After cooling, the organic phase is separated off, and the aqueous phase is extracted with MTBE. The combined organic phases are washed with water. The solution is dried using sodium sulfate and concentrated to dryness. The residue is purified by column chromatography (SiO₂, n-heptane:toluene=7:3). The further purification is carried out by recrystallisation from ethanol and n-heptane, giving 2-{4'-[(3,5-difluoro-4-trifluoromethylphenoxy)difluoromethyl]-2',3',5'-trifluorobiphenyl-4-yl}-5-propyltetrahydropyran as a colourless solid (m.p. 95° C.).

$^1$H-NMR (300 MHz, CHCl₃): δ=7.42-7.35 (m, 1H, $H_{arom.}$), 7.25-7.18 (m, 4H, $H_{arom.}$), 6.98 (d, 2H, J=9.8 Hz, $H_{arom.}$), 4.31 (dd, 1H, J=11.4 Hz, J=2.1 Hz), 4.11 (dm, 1H, J=11.4 Hz), 3.22 (t, 1H, J=11.4 Hz), 2.06-1.97 (m, 1H), 1.96-1.88 (m, 1H), 1.76-1.61 (m, 1H), 1.59-1.50 (m, 1H), 1.46-1.06 (m, 5H), 0.93 (t, 3H).

$^{19}$F-NMR (282 MHz, CHCl₃): δ=−56.3 (t, 3F, J=22.1 Hz, —CF₃), −61.7 (t, 2F, J=26.1 Hz, —OCF₂—), −108.2 to −108.4 (m, 2F, $F_{arom.}$), −110.6 to −110.8 (m, 2F, $F_{arom.}$), −117.0 (dd, 1F, J=12.0 Hz, J=7.8 Hz, $F_{arom.}$).

MS (EI): m/e (%)=580 (18, M⁺), 383 (100).

Comparison of Physical Data

| Compound | Example 1 | Comparative Example 1 [DE 103 53 658] |
|---|---|---|
| Structure | AGUQU-3-T | AUUQUU-3-T |
| Phase | C 95 N (89.9) I | C 91 I |
| Cl.p./° C. | 71 | 47 |
| Δε | 39.6 | 40.8 |
| Δn | 0.1379 | 0.1190 |
| Δε · Δn | 5.46 | 4.86 |
| Solubility in ZLI-4792 | 10% | 5% |

The compound from Example 1 has a higher extrapolated clearing point and a more favourable combination of Δε and Δn than Comparative Example 3. Furthermore, it has higher solubility in nematic LC media.

The advantageous properties of compound "AGUQU-3-T" were not evident from a comparison of the compounds Comparative Example 2 and Comparative Example 3 known from the literature with one another, since an inverse trend in the Δε·Δn quantity is observed.

| Compound | Comparative Example 2 [DE 103 53 658] | Comparative Example 3 [DE 103 53 658] |
|---|---|---|
| Structure | | |
| Phase | C 70 N 102.3 I | C 83 N (83.0) I |
| Δε | 29.7 | 34.9 |
| Δn | 0.1364 | 0.1231 |
| Δε · Δn | 4.05 | 4.30 |

Example 2

2-{4'-[(3,5-Difluoro-4-trifluoromethylphenoxy)difluoromethyl]-2,3',5'-trifluorobiphenyl-4-yl}-5-ethyltetrahydropyran

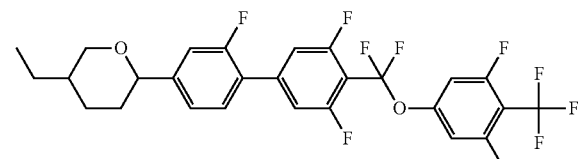

The compound according to the invention is prepared as described below:

2.1 Synthesis of 4-bromo-2-(4-bromo-3-fluorophenyl)-5-ethyltetrahydropyran

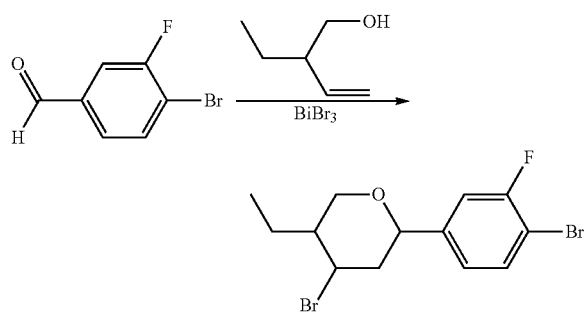

72.9 g (0.16 mol) of bismuth(III) bromide are initially introduced in 50 ml of toluene at −10° C., and a solution of 50.0 g (0.25 mol) of 4-bromo-3-fluorobenzaldehyde in 250 ml of toluene is added dropwise. A solution of 27.0 g (0.27 mol) of 2-ethylbut-3-en-1-ol in 50 ml of toluene is metered in at this temperature, and the mixture is stirred at 10° C. for 2 h. Dilute hydrochloric acid is added to the batch, and the organic phase is separated off. The aqueous phase is extracted with toluene, and the combined organic phases are washed successively with water, saturated sodium hydrogen-carbonate solution and saturated sodium chloride solution. The solution is dried using sodium sulfate and concentrated to dryness. The crude product is purified by column chromatography (SiO$_2$, n-heptane:toluene=2:1), giving 4-bromo-2-(4-bromo-3-fluorophenyl)-5-ethyltetrahydropyran as a colourless oil.

2.2 Synthesis of 4-bromo-5-ethyl-2-[3-fluoro-4-(4,4,5,5-tetramethyl-1,3,2-dioxaborolan-2-yl)phenyl]tetrahydropyran

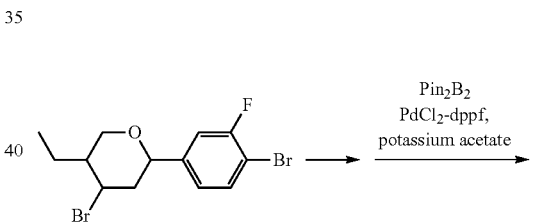

75.0 g (0.20 mol) of 4-bromo-2-(4-bromo-3-fluorophenyl)-5-ethyltetrahydropyran are heated at 105° C. for 18 h in 400 ml of toluene together with 60.0 g (0.24 mol) of bis(pinacolato)diboron, 50.0 g (0.51 mol) of potassium acetate and 1.5 g (2.04 mmol) of [1,1'-bis(diphenylphosphine)ferrocene]-palladium(II) chloride. After cooling, the mixture is washed with water, and the organic phase is separated off. The aqueous phase is extracted with toluene, and the combined organic phases are washed with saturated sodium chloride solution. The solution is dried using sodium sulfate and concentrated to dryness. The crude product is purified by column chromatography (SiO$_2$, n-heptane:toluene=1:1), giving 4-bromo-5-ethyl-2-[3-fluoro-4-(4,4,5,5-tetramethyl-1,3,2-dioxaborolan-2-yl)phenyl]tetrahydropyran as a yellowish oil.

2.3 Synthesis of 5-ethyl-2-[3-fluoro-4-(4,4,5,5-tetramethyl-1,3,2-dioxaborolan-2-yl)phenyl]tetrahydropyran

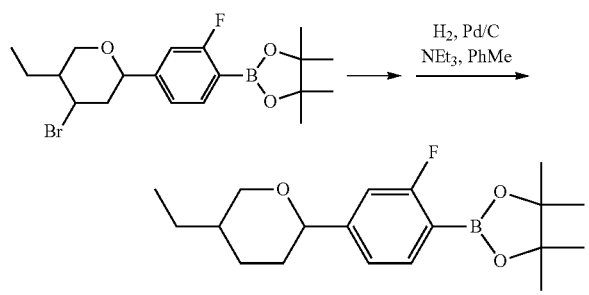

18.0 g (36.2 mmol) of 4-bromo-5-ethyl-2-[3-fluoro-4-(4,4,5,5-tetramethyl-1,3,2-dioxaborolan-2-yl)phenyl]tetrahydropyran are hydrogenated for 30 h at a hydrogen pressure of 5 bar and at 80° C. in toluene/water in the presence of Pd/C (5% of Pd) and 12.7 ml (88.1 mmol) of triethylamine. The organic phase is separated off and filtered absorptively (SiO$_2$, toluene). The filtrate is concentrated to dryness, and the residue is recrystallised from ethanol at reduced temperature, giving 5-ethyl-2-[3-fluoro-4-(4,4,5,5-tetramethyl-1,3,2-dioxaborolan-2-yl)phenyl]tetrahydropyran as a colourless solid.

2.4 Synthesis of 2-{4'-[(3,5-difluoro-4-trifluoromethylphenoxy)difluoromethyl]-2,3',5'-trifluorobiphenyl-4-yl}-5-ethyltetrahydropyran

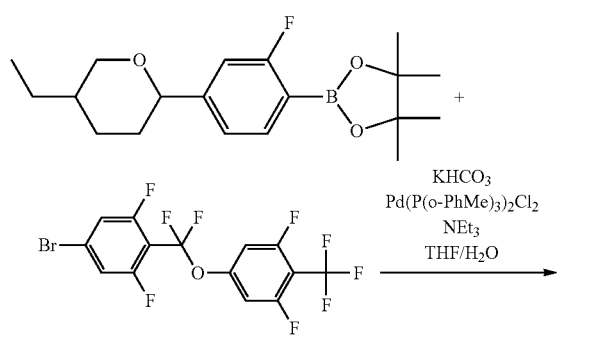

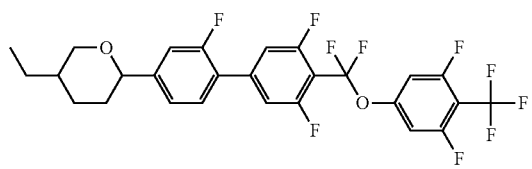

5.20 g (15.0 mmol) of 5-ethyl-2-[3-fluoro-4-(4,4,5,5-tetramethyl-1,3,2-dioxaborolan-2-yl)phenyl]tetrahydropyran are initially introduced in 35 ml of THF together with 6.93 g (15.0 mmol) of 5-((4-bromo-2,6-difluorophenyl)-difluoromethoxy)-1,3-difluoro-2-(trifluoromethyl)benzene. 590 mg (0.75 mmol) of bis(tri-o-tolylphosphine)palladium(II) chloride and 0.1 ml (0.75 mmol) of triethylamine are added. The mixture is heated to 50° C., and a solution of 2.41 g (24.0 mmol) of potassium hydrogencarbonate in 15 ml of water is added. After 3 h at this temperature, water and MTBE are added, and the organic phase is separated off. The aqueous phase is washed with MTBE, and the combined organic phases are washed with saturated sodium chloride solution and dried using sodium sulfate. The solution is concentrated to dryness, and the crude product is purified by column chromatography (SiO$_2$, n-heptane:toluene=1:1). The further purification is carried out by recrystallisation from ethanol and n-heptane, giving 2-{4'-[(3,5-difluoro-4-trifluoromethylphenoxy)difluoromethyl]-2,3',5'-trifluorobiphenyl-4-yl}-5-ethyltetrahydropyran as a colourless solid having an m.p. of 90° C.

$^1$H-NMR (400 MHz, CHCl$_3$): δ=7.41-7.36 (m, 1H, H$_{arom.}$), 7.25-7.19 (m, 4H, H$_{arom.}$), 6.98 (d, 2H, J=9.8 Hz, H$_{arom.}$), 4.31 (dd, 1H, J=11.5 Hz, J=2.1 Hz), 4.13 (dm, 1H, J=11.5 Hz), 3.22 (t, 1H, J=11.5 Hz), 2.07-2.00 (m, 1H), 1.65-1.51 (m, 3H), 1.33-1.13 (m, 3H), 0.94 (t, 3H, J=7.5 Hz).

$^{19}$F-NMR (282 MHz, CHCl$_3$): δ=−56.8 (t, 3F, J=22.1 Hz, —CF$_3$), −62.2 (t, 2F, J=26.1 Hz, —OCF$_2$—), −108.7 to −108.9 (m, 2F, F$_{arom.}$), −111.1 to −111.3 (m, 2F, F$_{arom.}$), −117.5 (dd, 1F, J=12.0 Hz, J=7.8 Hz, F$_{arom.}$).

MS (EI): m/e (%)=566 (11, M$^+$), 369 (100).

Physical Data

| Compound | Example 2 |
|---|---|
| Structure |  |

| Compound | Example 2 |
|---|---|
| Phase | C 90 I |
| Cl.p./° C. | 53 |
| Δε | 39.3 |
| Δn | 0.1316 |
| Δε · Δn | 5.17 |
| Solubility in ZLI-4792 | 10% |

The compound from Example 2 has a high extrapolated clearing point and a favourable combination of Δε and Δn. The compound is readily soluble in nematic media. Comparative Examples 4 and 5 do not show this:

| Compound | Comparative Example 4 [DE 103 53 658] | Comparative Example 5 [DE 103 53 658] |
|---|---|---|
| Structure | | |
| Phase | C 89 N (76.8) I | C 91 N (58.8) I |
| Δε | 29.9 | 35.0 |
| Δn | 0.1310 | 0.1149 |
| Δε · Δn | 3.91 | 4.02 |

Example 3

2-{4'-[(3,5-Difluoro-4-trifluoromethylphenoxy)difluoromethyl]-2,3',5'-trifluorobiphenyl-4-yl}-5-pentyltetrahydropyran

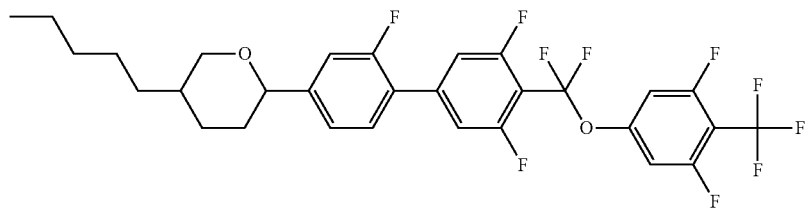

The compound according to the invention is prepared analogously to Example 2.

2-{4'-[(3,5-Difluoro-4-trifluoromethylphenoxy)difluoromethyl]-2,3',5'-trifluorobiphenyl-4-yl}-5-pentyltetrahydropyran is obtained as a colourless solid having an m.p. of 75° C.

$^1$H-NMR (300 MHz, CHCl$_3$): δ=7.42-7.35 (m, 1H, H$_{arom.}$), 7.25-7.18 (m, 4H, H$_{arom.}$), 6.98 (d, 2H, J=9.9 Hz, H$_{arom.}$), 4.31 (dd, 1H, J=11.4 Hz, J=2.0 Hz), 4.11 (dm, 1H, J=11.4 Hz), 3.21 (t, 1H, J=11.4 Hz), 2.07-1.97 (m, 1H), 1.96-1.88 (m, 1H), 1.74-1.49 (m, 3H), 1.40-1.07 (m, 8H), 0.90 (t, 3H, J=6.9 Hz).

$^{19}$F-NMR (282 MHz, CHCl$_3$): δ=−56.3 (t, 3F, J=21.9 Hz, —CF$_3$), −61.7 (t, 2F, J=26.4 Hz, —OCF$_2$—), −108.2 to −108.4 (m, 2F, F$_{arom.}$), −110.6 to −110.8 (m, 2F, F$_{arom.}$), −117.0 (dd, 1F, J=12.5 Hz, J=8.0 Hz, F$_{arom.}$).

MS (EI): m/e (%)=608 (9, M$^+$), 411 (100).

Physical Data

| Compound | Example 3 |
|---|---|
| Structure | |
| Phase | C 80 N 96 I |
| Cl.p./° C. | 77 |
| Δε | 36.7 |
| Δn | 0.1350 |
| Δε · Δn | 4.95 |
| Solubility in ZLI-4792 | 10% |

The compound from Example 3 has a high extrapolated clearing point and a favourable combination of Δε and Δn. The compound has a relatively broad nematic phase and is readily soluble in nematic media.

Example 4

5-Butyl-2-{4'-[(3,5-difluoro-4-trifluoromethylphenoxy)difluoromethyl]-2,3',5'-trifluorobiphenyl-4-yl}tetrahydropyran

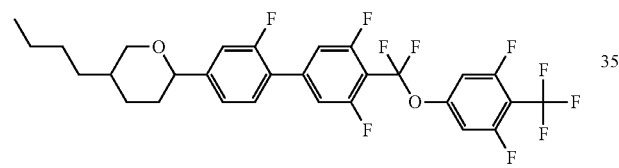

The compound according to the invention is prepared analogously to Example 2 by Suzuki coupling of 5-butyl-2-[3-fluoro-4-(4,4,5,5-tetramethyl-1,3,2-dioxaborolan-2-yl)phenyl]tetrahydropyran to 5-((4-bromo-2,6-difluorophenyl)difluoromethoxy)-1,3-difluoro-2-(trifluoromethyl)benzene. 5-Butyl-2-{4'-[(3,5-difluoro-4-trifluoromethylphenoxy)difluoromethyl]-2,3',5'-trifluorobiphenyl-4-yl}tetrahydropyran is obtained as a colourless solid having an m.p. of 88° C. The successful synthesis is confirmed perfectly by NMR spectroscopy ($^1$H, $^{19}$F, $^{13}$C) and mass spectroscopy (EI).

Physical Data

| Compound | Example 4 |
|---|---|
| Structure | |
| Phase | C 79 N 88 I |
| Cl.p./° C. | 71 |
| Δε | 36.6 |
| Δn | 0.1309 |
| Δε · Δn | 4.79 |
| Solubility in ZLI-4792 | 10% |

The compound from Example 4 has a high extrapolated clearing point and a favourable combination of Δε and Δn. The compound has a nematic phase and is readily soluble in nematic media.

Example 5

2-{4'-[(3,5-Difluoro-4-trifluoromethylphenoxy)difluoromethyl]-2,3',5'-trifluorobiphenyl-4-yl}-5-heptyltetrahydropyran

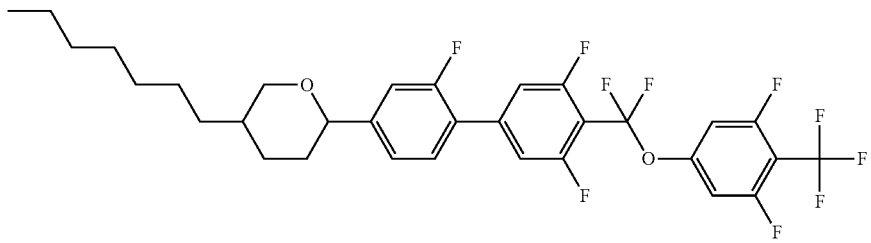

The compound according to the invention is prepared analogously to Example 2 by Suzuki coupling of 2-[3-fluoro-4-(4,4,5,5-tetramethyl-1,3,2-dioxaborolan-2-yl)phenyl]-5-heptyltetrahydropyran to 5-((4-bromo-2,6-difluorophenyl)difluoromethoxy)-1,3-difluoro-2-(trifluoromethyl)benzene.

2-{4'-[(3,5-Difluoro-4-trifluoromethylphenoxy)difluoromethyl]-2,3',5'-trifluorobiphenyl-4-yl}-5-heptyltetrahydropyran is obtained as a colourless solid having an m.p. of 68° C. The successful synthesis is confirmed perfectly by NMR spectroscopy ($^{1}$H, $^{19}$F, $^{13}$C) and mass spectroscopy (EI).

Physical Data

| Compound | Example 5 |
|---|---|
| Structure | 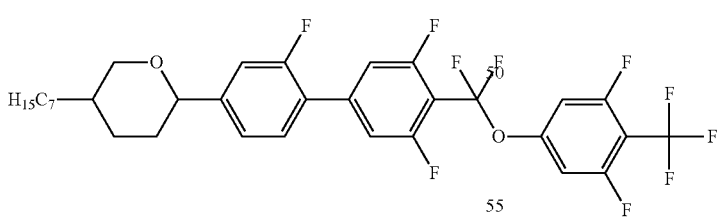 |
| Phase | C 68 N 93 I |
| Cl.p./° C. | 78 |
| Δε | 34.6 |
| Δn | 0.1314 |
| Δε · Δn | 4.69 |
| Solubility in ZLI-4792 | 10% |

The compound from Example 5 has a high extrapolated clearing point and a favourable combination of Δ∈ and Δn. The compound has a nematic phase and is readily soluble in nematic media.

Example 6

4-[(3,5-Difluoro-4-trifluoromethylphenoxy)difluoromethyl]-4'-(4-ethylcyclohexyl)-3,5,2'-trifluorobiphenyl

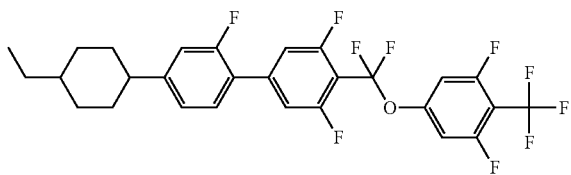

The compound 4-[(3,5-difluoro-4-trifluoromethylphenoxy)difluoromethyl]-4'-(4-ethylcyclohexyl)-3,5,2'-trifluorobiphenyl according to the invention is prepared as described below:

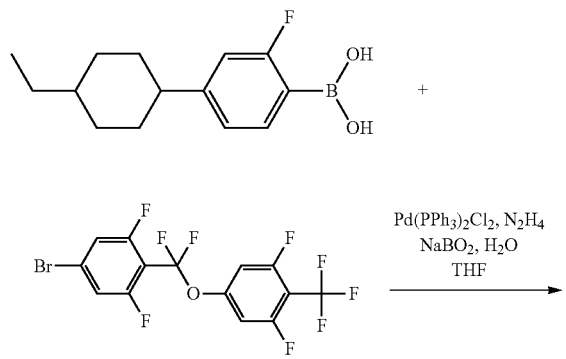

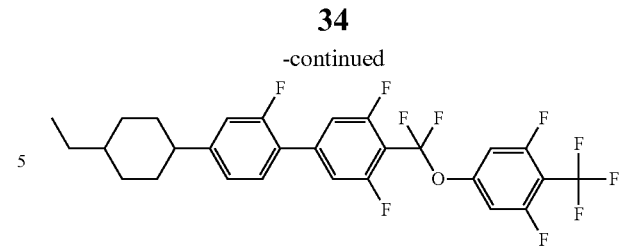

0.11 ml (2.33 mmol) of hydrazine hydroxide is added to a mixture of 9.70 g (22.1 mmol) of 5-((4-bromo-2,6-difluorophenyl)difluoromethoxy)-1,3-difluoro-2-(trifluoromethyl)benzene, 12 ml (18 mmol) of 1.5 N aqueous sodium metaborate soln. and 0.62 g (0.88 mmol) of bis(triphenylphosphine)palladium(II) chloride in 150 ml of THF at room temperature. 6.1 g (24.3 mmol) of 4-(4-ethylcyclohexyl)-2-fluorobenzeneboronic acid are added, and the mixture is heated at the boil for 18 h. After cooling, water is added, and the batch is extracted with MTBE. The aqueous phase is extracted with MTBE, and the combined organic phases are washed with water and saturated sodium chloride solution. The solution is dried using sodium sulfate and concentrated to dryness. The crude product is purified by column chromatography (SiO$_2$, n-heptane:1-chlorobutane=9:1). The further purification is carried out by recrystallisation from ethanol and n-heptane, giving 4-[(3,5-difluoro-4-trifluoromethylphenoxy)difluoromethyl]-4'-(4-ethylcyclohexyl)-3,5,2'-trifluorobiphenyl as a colourless solid having an m.p. of 77° C.

$^1$H-NMR (300 MHz, CHCl$_3$): δ=7.37-7.31 (m, 1H, H$_{arom.}$), 7.25-7.17 (m, 2H, H$_{arom.}$), 7.12-6.94 (m, 4H, H$_{arom.}$), 2.58-2.46 (m, 1H, H$_{benzyl.}$), 1.99-1.85 (m, 4H), 1.54-1.37 (m, 2H), 1.35-1.15 (m, 3H), 1.14-0.98 (m, 2H), 0.92 (t, 3H, J=7.0 Hz).

$^{19}$F-NMR (282 MHz, CHCl$_3$): δ=−56.3 (t, 3F, J=22.2 Hz, —CF$_3$), −61.7 (t, 2F, J=26.0 Hz, —OCF$_2$—), −108.2 to −108.4 (m, 2F, F$_{arom.}$), −110.7 to −111.0 (m, 2F, F$_{arom.}$), −117.4 (dd, 1F, J=12.4 Hz, J=8.4 Hz, F$_{arom.}$).

MS (EI): m/e (%)=564 (6, M$^+$), 367 (100).

Comparison of Physical Data

| Compound | Example 6 | Comparative Example 6 [EP 1 454 975] |
|---|---|---|
| Structure | ![structure] | ![structure] |
| Phase | C 77 N 87 I | C 85 N (85.0) I |
| Cl.p./° C. | 56 | |
| Δε | 32.6 | 28.7 |
| Δn | 0.1361 | 0.1150 |
| Δε · Δn | 4.44 | 3.30 |
| Solubility in ZLI-4792 | 10% | |

The compound from Example 6 has significantly better properties for use in the media according to the invention than Comparative Example 6 known from the literature. Example 6 has a broader nematic phase and a more favourable value of Δ∈·Δn.

Example 7

4-[(3,5-Difluoro-4-trifluoromethylphenoxy)difluoromethyl]-4'-(4-propylcyclohexyl)-3,5,2'-trifluorobiphenyl

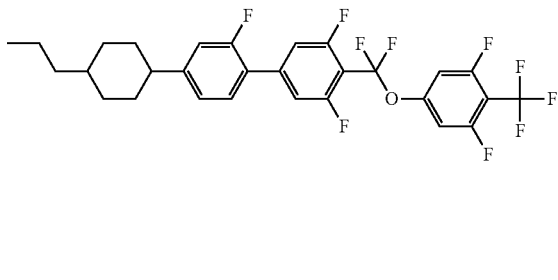

The compound according to the invention is prepared analogously to Example 6 using 4-(4-propylcyclohexyl)-2-fluorobenzeneboronic acid as starting material.

4-[(3,5-Difluoro-4-trifluoromethylphenoxy)difluoromethyl]-4'-(4-propylcyclohexyl)-3,5,2'-trifluorobiphenyl is obtained as a colourless solid having an m.p. of 86° C.

$^1$H-NMR (300 MHz, CHCl$_3$): δ=7.37-7.30 (m, 1H, H$_{arom.}$), 7.25-7.17 (m, 2H, H$_{arom.}$), 7.12-6.94 (m, 4H, H$_{arom.}$), 2.59-2.46 (m, 1H, H$_{benzyl.}$), 1.99-1.84 (m, 4H), 1.54-1.15 (m, 7H), 1.14-0.99 (m, 2H), 0.91 (t, 3H, J=7.0 Hz).

$^{19}$F-NMR (282 MHz, CHCl$_3$): δ=−56.3 (t, 3F, J=22.0 Hz, —CF$_3$), −61.6 (t, 2F, J=26.3 Hz, —OCF$_2$—), −108.2 to −108.4 (m, 2F, F$_{arom.}$), −110.7 to −111.0 (m, 2F, F$_{arom.}$), −117.5 (dd, 1F, J=12.7 Hz, J=8.2 Hz, F$_{arom.}$).

MS (EI): m/e (%)=578 (7, M$^+$), 381 (100).

Comparison of Physical Data

| Compound | Example 7 | Comparative Example 7 [EP 1 454 975] |
|---|---|---|
| Structure | H$_7$C$_3$-[structure] | H$_7$C$_3$-[structure] |
| Phase | C 86 N 118.5 I | C 94 N 112.4 I |
| Cl.p./° C. | 81 | 64 |
| Δ∈ | 33.7 | 28.6 |
| Δn | 0.1440 | 0.1240 |
| Δ∈ · Δn | 4.85 | 3.55 |
| Solubility in ZLI-4792 | 10% | 10% |

The compound from Example 7 has a broader nematic phase, a higher clearing point and a more favourable combination of Δ∈ and Δn than the comparative example.

Example 8

4-[(3,5-Difluoro-4-trifluoromethylphenoxy)difluoromethyl]-4'-(4-pentylcyclohexyl)-3,5,2'-trifluorobiphenyl

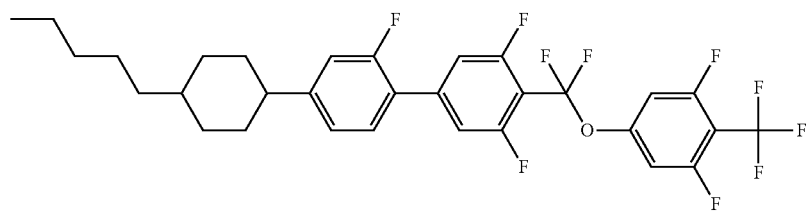

The compound according to the invention is prepared analogously to Example 5 using 4-(4-pentylcyclohexyl)-2-fluorobenzeneboronic acid as starting material.

4-[(3,5-Difluoro-4-trifluoromethylphenoxy)difluoromethyl]-4'-(4-pentylcyclohexyl)-3,5,2'-trifluorobiphenyl is obtained as a colourless solid having an m.p. of 74° C.

$^1$H-NMR (300 MHz, CHCl$_3$): δ=7.37-7.30 (m, 1H, H$_{arom.}$), 7.25-7.17 (m, 2H, H$_{arom.}$), 7.12-6.94 (m, 4H, H$_{arom.}$), 2.59-2.46 (m, 1H, H$_{benzyl}$), 1.98-1.85 (m, 4H), 1.54-1.17 (m, 11H), 1.15-0.98 (m, 2H), 0.90 (t, 3H, J=7.0 Hz).

$^{19}$F-NMR (282 MHz, CHCl$_3$): δ=−56.3 (t, 3F, J=22.0 Hz, —CF$_3$), −61.7 (t, 2F, J=26.3 Hz, —OCF$_2$—), −108.2 to −108.4 (m, 2F, F$_{arom.}$), −110.7 to −111.0 (m, 2F, F$_{arom.}$), −117.5 (dd, 1F, J=12.7 Hz, J=8.2 Hz, F$_{arom.}$).

MS (EI): m/e (%)=606 (6, M$^+$), 409 (100).

Physical Data

| Compound | Example 8 |
|---|---|
| Structure | (structure) |
| Phase | C 74 N 122 I |
| Cl.p./° C. | 85 |
| Δε | 32.6 |
| Δn | 0.1389 |
| Δε · Δn | 4.53 |
| Solubility in ZLI-4792 | 10% |

The compound from Example 8 has a high clearing point and a favourable combination of Δε and Δn. The compound has a broad nematic phase and is readily soluble in nematic media.

Example 9

4-[(3,5-Difluoro-4-trifluoromethylphenoxy)difluoromethyl]-3,5,2'-trifluoro-4"-propyl-[1,1';4',1"]terphenyl

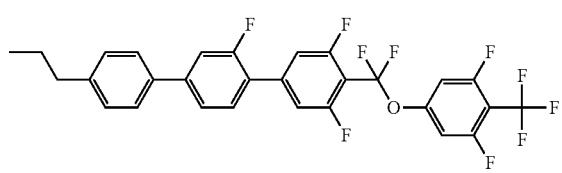

The compound 4-[(3,5-difluoro-4-trifluoromethylphenoxy)difluoromethyl]-3,5,2'-trifluoro-4"-propyl-[1,1';4',1"]terphenyl according to the invention is prepared as described below:

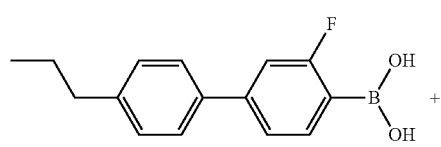

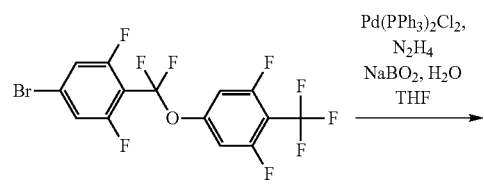

-continued (structure)

0.11 ml (2.33 mmol) of hydrazine hydroxide is added to a mixture of 10.3 g (23.4 mmol) of 5-((4-bromo-2,6-difluorophenyl)difluoromethoxy)-1,3-difluoro-2-(trifluoromethyl)benzene, 12 ml (18 mmol) of 1.5 N aqueous sodium metaborate soln. and 0.62 g (0.88 mmol) of bis(triphenylphosphine) palladium(II) chloride in 150 ml of THF at room temperature. 6.0 g (23.2 mmol) of 3-fluoro-4'-propylbiphen-4-ylboronic acid are added, and the mixture is heated at the boil for 19 h. After cooling, water is added, and the batch is extracted with MTBE. The aqueous phase is extracted with MTBE, and the combined organic phases are washed with water and saturated sodium chloride solution. The solution is dried using sodium sulfate and concentrated to dryness. The crude product is purified by column chromatography (SiO$_2$, n-heptane:1-chlorobutane=9:1). The further purification is carried out by recrystallisation from ethanol and n-heptane, giving 4-[(3,5-difluoro-4-trifluoromethylphenoxy)difluoromethyl]-3,5,2'-trifluoro-4"-propyl-[1,1';4',1"]terphenyl as a colourless solid having an m.p. of 128° C.

$^1$H-NMR (400 MHz, CHCl$_3$): δ=7.54 (d, 2H, J=8.3 Hz, H$_{arom.}$), 7.50-7.48 (m, 2H, H$_{arom.}$), 7.43 (dm, 1H, J=12.9 Hz, H$_{arom.}$), 7.32-7.25 (m, 4H, H$_{arom.}$), 7.00 (d, 2H, J=9.9 Hz, H$_{arom.}$), 2.65 (t, 2H, J=7.8 Hz, H$_{benzyl}$), 1.74-1.65 (m, 2H, H$_{aliphat.}$), 0.98 (t, 3H, J=7.3 Hz, H$_{aliphat.}$).

$^{19}$F-NMR (376 MHz, CHCl$_3$): δ=−56.8 (t, 3F, J=22.0 Hz, —CF$_3$), −62.2 (t, 2F, J=26.0 Hz, —OCF$_2$—), −108.7 to −108.9 (m, 2F, F$_{arom.}$), −111.0 to −111.2 (m, 2F, F$_{arom.}$), −117.3 to −117.4 (m, 1F, F$_{arom.}$).

MS (EI): m/e (%)=572 (33, M$^+$), 375 (100).

Physical Data

| Compound | Example 9 |
|---|---|
| Structure | |
| Phase | C 128 N (120.7) I |
| Cl.p./° C. | 89 |
| Δε | 39.2 |
| Δn | 0.2029 |
| Δε · Δn | 7.95 |
| Solubility in ZLI-4792 | 5% |

The compound from Example 9 has a high clearing point and a good combination of Δε and Δn. It is distinguished, in particular, by the high Δn.

Example 10

4-[(3,5-Difluoro-4-trifluoromethylphenoxy)difluoromethyl]-3,5,2'-trifluoro-4''-pentyl-[1,1';4',1'']terphenyl

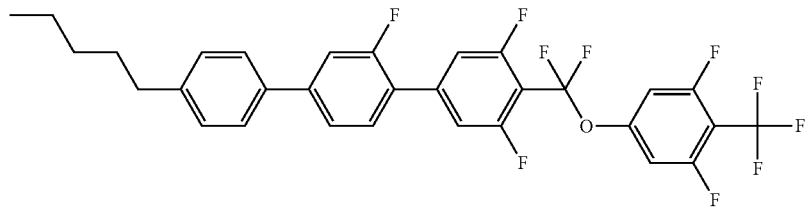

The compound according to the invention is prepared analogously to Example 9 using 3-fluoro-4'-pentylbiphen-4-ylboronic acid as starting material.

4-[(3,5-Difluoro-4-trifluoromethylphenoxy)difluoromethyl]-3,5,2'-trifluoro-4''-pentyl-[1,1';4',1'']terphenyl is obtained as a colourless solid having an m.p. of 96° C.

$^1$H-NMR (300 MHz, CHCl$_3$): δ=7.54 (d, 2H, J=8.3 Hz, H$_{arom.}$), 7.50-7.48 (m, 2H, H$_{arom.}$), 7.43 (dm, 1H, J=12.9 Hz, H$_{arom.}$), 7.32-7.25 (m, 4H, H$_{arom.}$), 7.00 (d, 2H, J=9.9 Hz, H$_{arom.}$), 2.67 (t, 2H, J=7.8 Hz, H$_{benzyl.}$), 1.73-1.61 (m, 2H, H$_{aliphat.}$), 1.41-1.31 (m, 4H, H$_{aliphat.}$), 0.91 (t, 3H, J=6.8 Hz, H$_{aliphat.}$).

$^{19}$F-NMR (282 MHz, CHCl$_3$): δ=−56.3 (t, 3F, J=22.0 Hz, —CF$_3$), −61.8 (t, 2F, J=26.0 Hz, —OCF$_2$—), −108.1 to −108.4 (m, 2F, F$_{arom.}$), −110.5 to −110.7 (m, 2F, F$_{arom.}$), −116.7 to −116.8 (m, 1F, F$_{arom.}$).

MS (EI): m/e (%)=600 (30, M$^+$), 403 (100).

Physical Data

| Compound | Example 10 |
|---|---|
| Structure | (structural formula) |
| Phase | C 96 N 115.5 I |
| Cl.p./° C. | 91 |
| Δε | 37.0 |
| Δn | 0.1988 |
| Δε · Δn | 7.36 |
| Solubility in ZLI-4792 | 10% |

The compound from Example 10 has a high clearing point and a good combination of Δε and Δn. The compound has a nematic phase and is readily soluble in nematic media.

Mixture Examples

The following acronyms are used to describe the components of the liquid-crystalline base mixture (host). The index n adopts a value of 1 to 9. The compounds are suitable for the preparation of liquid-crystalline media according to the invention.

Table A

Acronyms for LC components

AUUQU-n-F

AUUQU-n-T

AUUQU-n-OT

AGUQU-n-F

Table A-continued

Acronyms for LC components

AGUQU-n-T

CGUQUU-n-T

PGUQU-n-T

PUQU-n-F

PUZU-n-F

The following monomers are preferably used:

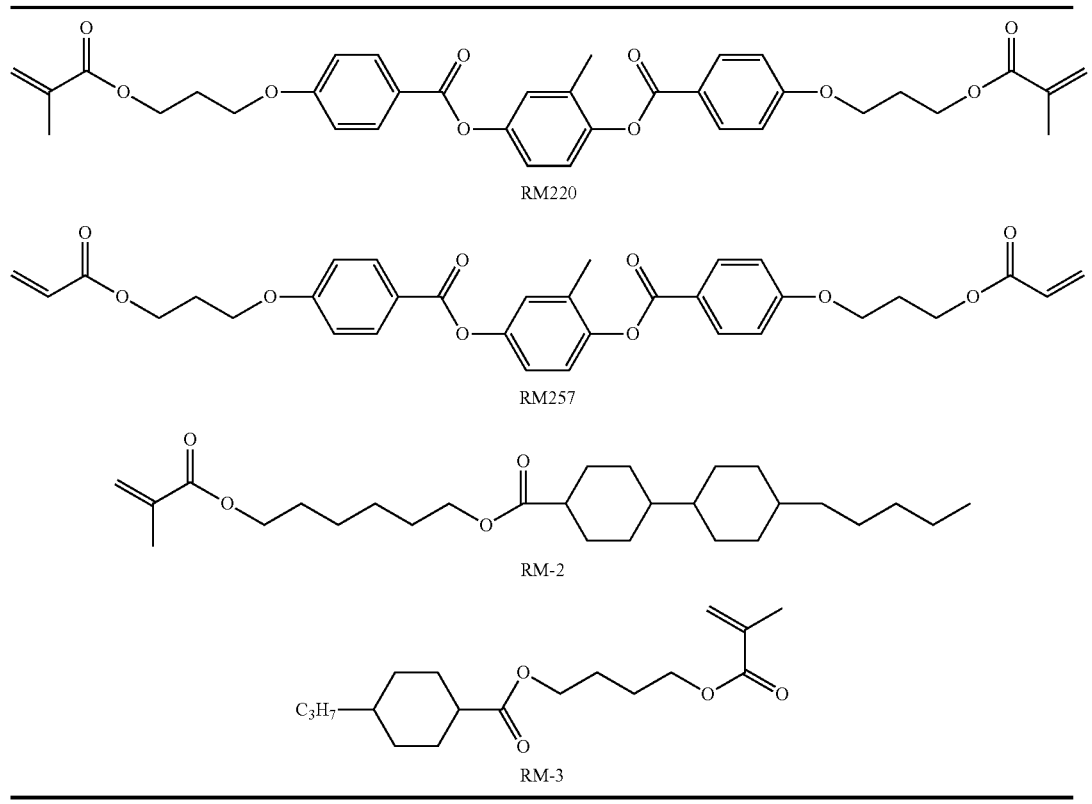

RM220 has the phase sequence C 82.5 N 97 I.
RM257 has the phase sequence C 66 N 127 I.

The following additives are preferably used
(DP: chiral dopant, IN: polymerisation initiator):

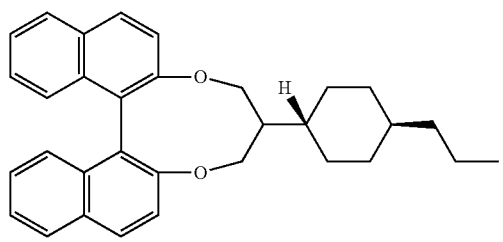

DP-1

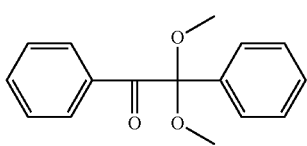

IN-1
(Ciba ® Irgacure ® 651)

Further chiral dopants and polymerisation initiators for LC mixtures are known to the person skilled in the art and are expressly mentioned here.

The media are characterised as described before the polymerisation. The RM components are then polymerised by irradiation once (180 s) in the blue phase, and the media obtained are re-characterised.

Description of the Polymerisation

Before the polymerisation of a sample, the phase properties of the medium are established in a test cell having a thickness of about 10 microns and an area of 2×2.5 cm. The filling is carried out by capillary action at a temperature of 75° C. The unpolymerised medium is measured under a polarising microscope with heating stage at a temperature chain of 1° C./min. The polymerisation of the media is carried out by irradiation using a UV lamp (Hönle, Bluepoint 2.1, 365 nm interference filter) having an effective power of about 1.5 mW/cm² for 180 seconds. The polymerisation is carried out directly in the electro-optical test cell. The polymerisation is carried out initially at a temperature at which the medium is in blue phase I (BP-I). The polymerisation is carried out in a plurality of part-steps which little by little result in complete polymerisation. The temperature range of the blue phase generally changes during the polymerisation. The temperature is therefore adapted between each part-step in such a way that the medium is still in the blue phase. In practice, this can be carried out by observing the sample under the polarising microscope after each irradiation operation of about 5 s or longer. If the sample becomes darker, this indicates a transition into the isotropic phase. The temperature for the next part-step is reduced correspondingly. The entire irradiation time which results in maximum stabilisation is typically 180 s at the irradiation power indicated. Further polymerisations can be carried out in accordance with an optimised irradiation/temperature programme. Alternatively, the polymerisation can also be carried out in a single irradiation step, in particular if a broad blue phase is already present before the polymerisation.

Electro-Optical Characterisation

After the above-described polymerisation and stabilisation of the blue phase, the phase width of the blue phase is determined. The electro-optical characterisation is subsequently carried out at various temperatures within and, if desired, also outside this range.

The test cells used are fitted on one side with interdigital electrodes on the cell surface. The cell gap, the electrode separation and the electrode width are typically each 1 to 10 microns. This uniform dimension is referred to below as the gap width. The area covered by electrodes is about 0.4 cm². The test cells do not have an alignment layer. For the electro-optical characterisation, the cell is located between crossed polarising filters, where the longitudinal direction of the electrodes adopts an angle of 45° to the axes of the polarising filter. The measurement is carried out using a DMS301 (Autronic-Melchers) at right angles to the cell plane or by means of a highly sensitive camera on the polarising microscope. In the voltage-free state, the arrangement described gives an essentially dark image (definition 0% transmission).

Firstly, the characteristic operating voltages and then the response times are measured on the test cell. The operating voltage at the cell electrodes is applied in the form of a rectangular voltage with alternating sign (frequency 100 Hz) and variable amplitude, as described below.

The transmission in the voltage-free state is defined as 0%. The transmission is measured while the operating voltage is increased. The reaching of the maximum value of about 100% intensity defines the characteristic quantity of the operating voltage, $V_{100}$. Equally, the characteristic voltage $V_{10}$ at 10% of maximum transmission is determined. These values are optionally measured at various temperatures in the region of the blue phase, in any case at room temperature (20° C.).

At the lower end of the temperature range of the blue phase, relatively high characteristic operating voltages $V_{100}$ are observed. At the upper end of the temperature range (close to the clearing point), the value of $V_{100}$ increases considerably. In the region of the minimum operating voltage, $V_{100}$ generally only increases slowly with the temperature. This temperature range, limited by $T_1$ and $T_2$, is known as the usable, flat temperature range (FR). The width of this 'flat range' (FR) is ($T_2-T_1$) and is known as the width of the flat range (WFR). The precise values of $T_1$ and $T_2$ are determined by the intersections of tangents at the flat curve section FR and the adjacent steep curve sections in the $V_{100}$/temperature diagram. In the second part of the measurement, the response times are determined during switching on and off ($\tau_{on}$, $\tau_{off}$). The response time $\tau_{on}$ is defined by the time taken to achieve 90% intensity after application of a voltage at the level of $V_{100}$ at the selected temperature. The response time $\tau_{off}$ is defined by the time taken to decrease by 90% starting from maximum intensity at $V_{100}$ after reduction of the voltage to 0 V. The response time is also determined at various temperatures in the region of the blue phase.

As further characterisation, the transmission can be measured at a temperature within the FR with a continuously varied operating voltage between 0 V and $V_{100}$. On comparison of the curves for increasing and for decreasing operating voltage, hysteresis may occur. The difference in the transmissions at $0.5 \cdot V_{100}$ and the difference in the voltages at 50% transmission are, for example, characteristic hysteresis values and are known as $\Delta T_{50}$ and $\Delta V_{50}$ respectively.

As a further characteristic quantity, the ratio of the transmission in the voltage-free state before and after passing through a switching cycle can be measured. This transmission ratio is known as the "memory effect". The value of the memory effect in the ideal state is 1.0. Values above 1 mean that a certain memory effect is present in the form of excessive residual transmission after the cell has been switched on and off. This value is also determined in the working range of the blue phase (FR).

The measurement values, unless indicated otherwise, are determined at 20° C.

Mixture Example 1

Host Mixture

| Component | % by weight |
|---|---|
| PUQU-3-F | 5 |
| AUUQU-2-F | 6 |
| AUUQU-3-F | 10 |
| AUUQU-4-F | 6 |
| AUUQU-5-F | 9 |
| AUUQU-7-F | 6 |
| AUUQU-3-T | 6 |
| AUUQU-4-T | 6 |
| AUUQU-5-T | 8 |
| PUZU-2-F | 6 |
| PUZU-3-F | 10 |
| PUZU-5-F | 9 |
| AGUQU-3-T | 13 |

$\Delta\epsilon$: 153,
$\Delta n$: 0.147

Mixture Example 2

Host Mixture

| Component | % by weight |
|---|---|
| PUQU-3-F | 5 |
| AUUQU-2-F | 12 |
| AUUQU-3-F | 15 |
| AUUQU-4-F | 8 |
| AUUQU-5-F | 12 |
| AUUQU-7-F | 10 |
| PUZU-2-F | 6 |
| PUZU-3-F | 10 |
| PUZU-5-F | 9 |
| AGUQU-3-T | 13 |

$\Delta\epsilon$: 140,
$\Delta n$: 0.144.

Mixture Example 3

A typical polymer-stabilised mixture has the composition as shown in the table:

| Component | % by weight |
|---|---|
| Host mixture | 85 |
| IN-1 | 0.2 |
| Monoreactive mesogen (RM-2/RM-3) | 5 |

-continued

| Component | % by weight |
|---|---|
| Direactive mesogen (RM220/RM257) | 6 |
| Chiral dopant DP-1 | 3.8 |

The polymerisable mixture is polymerised in a single irradiation step at a temperature of about 30-50° C. at the lower end of the region of the blue phase (details cf. above). The polymer-stabilised liquid-crystalline media exhibit a blue phase over a broad temperature range.

Further combinations of the embodiments and variants of the invention in accordance with the description also arise from the following claims.

The invention claimed is:

1. A compound of formula I

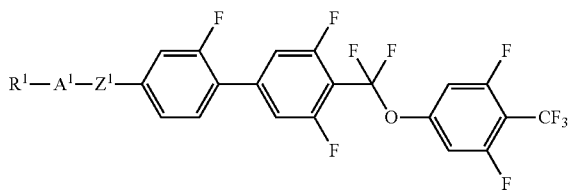

in which
A$^1$ denotes 1,4-phenylene, which is optionally up to tetra-substituted, independently of one another, by halogen, CN, CH$_3$, CHF$_2$, CH$_2$F, OCH$_3$, OCHF$_2$ or OCF$_3$ and in which 1-2 CH groups are optionally replaced by N, cyclohexene-1,4-diyl, in each of which 1-2 CH$_2$ groups are optionally replaced, independently of one another, by O or S and/or H may be replaced by F, bicyclo[1.1.1]pentane-1,3-diyl, bicyclo[2.2.2]octane-1,4-diyl, spiro[3.3]heptane-2,6-diyl, tetrahydropyran-2,5-diyl, 1,3-dioxane-2,5-diyl, 2,5-thiophenediyl or 2,5-selenophenediyl, Z$^1$ denotes a bonding unit selected from the group consisting of a single bond, CF$_2$O, CH$_2$CH$_2$, CF$_2$CH$_2$, CF$_2$CF$_2$, CFHCFH, CFHCH$_2$, (CO)O, CH$_2$O, C≡C, CH═CH, CF═CH, and CF═CF; where asymmetrical bonding units may be oriented in either of both possible directions, and R$^1$ denotes an unsubstituted alkyl radical having 1 to 15 C atoms, in which one or more CH$_2$ groups may each be replaced, independently of one another, by —C≡C—, —CH═CH—, —CF═CF—, —CF═CH—, —CH═CF—, —(CO)O—, —O(CO)—, —(CO)— or —O— in such a way that O atoms are not linked directly to one another, H, F, Cl, Br, CN, CF$_3$, OCF$_3$, SCN, NCS or SF$_5$.

2. A compound according to claim 1, wherein Z$^1$ denotes a single bond.

3. A compound according to claim 1, wherein A$^1$ denotes

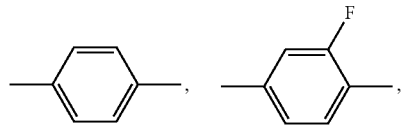

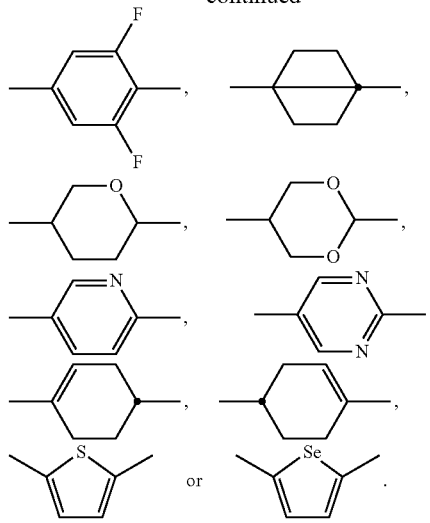

4. A compound according to claim 1, wherein R$^1$ denotes an alkyl radical having 1 to 15 C atoms, in which one or more CH$_2$ groups may each be replaced, independently of one another, by —C≡C—, —CH═CH—, —(CO)O—, —O(CO)—, —(CO)— or —O— in such a way that O atoms are not linked directly to one another.

5. A compound according to claim 1, wherein R$^1$ denotes a straight-chain alkyl radical having 1 to 12 C atoms.

6. A compound according to claim 1, wherein R$^1$ denotes a straight-chain alkyl radical having 3 C atoms.

7. A process for preparing a compound of formula I

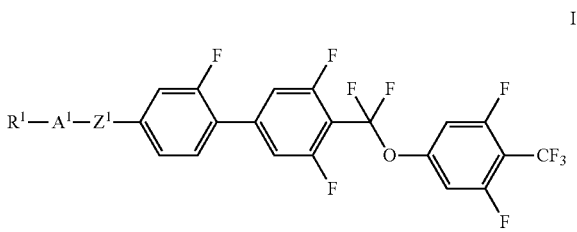

in which
A$^1$ denotes 1,4-phenylene, which is optionally up to tetra-substituted, independently of one another, by halogen, CN, CH$_3$, CHF$_2$, CH$_2$F, OCH$_3$, OCHF$_2$ or OCF$_3$ and in which 1-2 CH groups are optionally replaced by N, cyclohexane-1,4-diyl or cyclohexene-1,4-diyl, in each of which 1-2 CH$_2$ groups are optionally replaced, independently of one another, by O or S and/or H may be replaced by F, bicyclo[1.1.1]pentane-1,3-diyl, bicyclo[2.2.2]octane-1,4-diyl, spiro[3.3]heptane-2,6-diyl, tetrahydropyran-2,5-diyl, 1,3-dioxane-2,5-diyl, 2,5-thiophenediyl or 2,5-selenophenediyl, Z$^1$ denotes a bonding unit selected from the group consisting of a single bond, CF$_2$O, CH$_2$CH$_2$, CF$_2$CH$_2$, CF$_2$CF$_2$, CFHCFH, CFHCH$_2$, (CO)O, CH$_2$O, C≡C, CH═CH, CF═CH, and CF═CF; where asymmetrical bonding units may be oriented in either of both possible directions, and R$^1$ denotes an unsubstituted alkyl radical having 1 to 15 C atoms, in which one or more CH$_2$ groups may each be replaced, independently of one another, by —C≡C—, —CH=CH—, —CF=CF—, —CF=CH—, —CH=CF—, —(CO)O—, —O(CO)—, —(CO)— or —O— in such a way that O atoms are not linked directly to one another, H, F, Cl, Br, CN CF$_3$, OCF$_3$, SCN, NCS or SF$_5$, comprising reacting in the presence of a transition-metal catalyst a compound of formula A with a compound of formula B

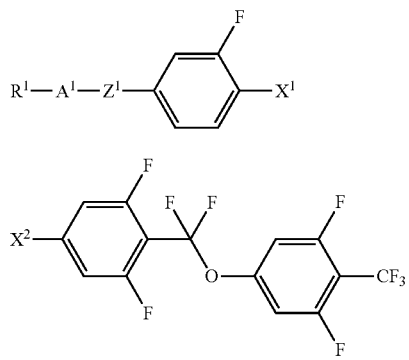

in which R$^1$, A$^1$ and Z$^1$ are as defined for formula I, and

X$^1$ or X$^2$ denotes —B(OH)$_2$, a boronic acid ester or a boronate salt, and the other of X$^1$ or X$^2$ denotes Cl, Br, I or —O(SO$_2$)CF$_3$.

8. A liquid-crystalline medium, comprising one or more compounds of formula I according to claim 1 and at least one further liquid-crystalline compound.

9. A liquid-crystalline medium according to claim 8, further comprising one or more compounds of formulae II and/or III:

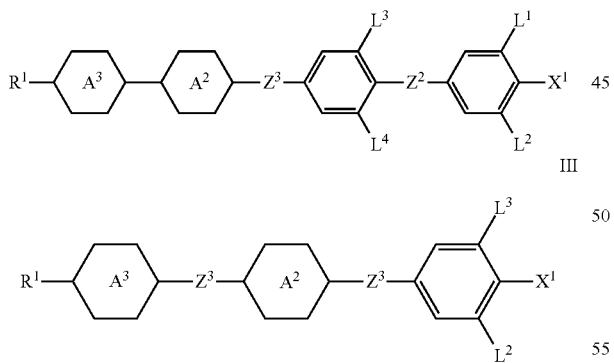

in which

R$^1$, independently of one another, denotes an unsubstituted alkyl radical having 1 to 15 C atoms, in which one or more CH$_2$ groups may each be replaced, independently of one another, by —C≡C—, —CH=CH—, —CF=CF—, —CF=CH—, —CH=CF—, —(CO)O—, —O(CO)—, —(CO)— or —O— in such a way that O atoms are not linked directly to one another, A$^2$, A$^3$, independently of one another, denote

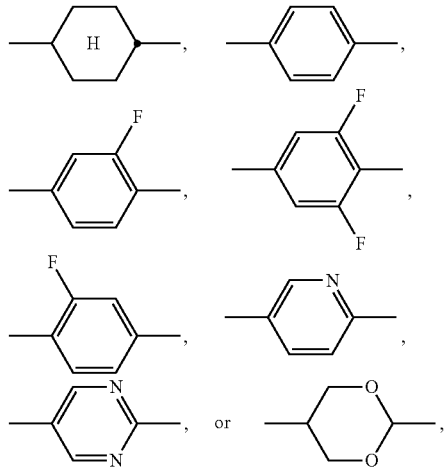

Z$^2$, Z$^3$, independently of one another, denote a bonding unit selected from the group consisting of a single bond, CF$_2$O, CH$_2$CH$_2$, CF$_2$CH$_2$, CF$_2$CF$_2$, CFHCFH, CFHCH$_2$, (CO)O, CH$_2$O, C≡C, CH=CH, CF=CH, and CF=CF; where asymmetrical bonding units may be oriented in either of both possible directions, X$^1$ denotes F, Cl, CN, or alkyl, alkenyl, alkenyloxy, alkoxyalkyl or alkoxy having 1 to 3 C atoms, which is mono- or polysubstituted by F, and L$^1$ to L$^4$ denote H or F.

10. An electro-optical display, containing a compound of claim 1.

11. An electro-optical display device containing a liquid-crystalline medium according to claim 8.

12. An electro-optical display device according to claim 11, which operates entirely or partly in the region of the liquid-crystalline blue phase.

13. A compound according to claim 1, wherein A$^1$ denotes

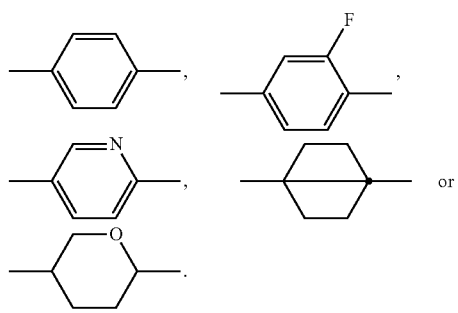

14. A compound according to claim 1, which is selected from the group consisting of

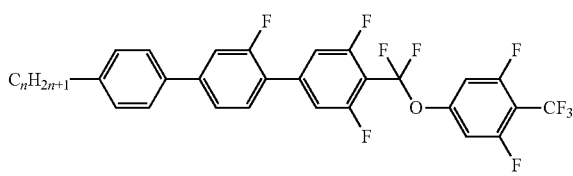

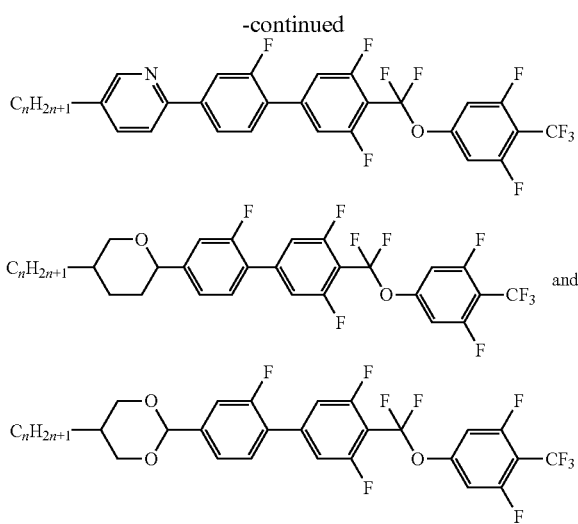

in which n=1, 2, 3, 4, 5, 6 or 7.

15. A compound according to claim 14, wherein n=3.

16. A compound according to claim 1, wherein
A$^1$ denotes

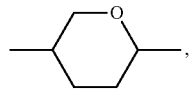

and

Z$^1$ denotes a single bond.

17. A process according to claim 7, wherein
A$^1$ denotes

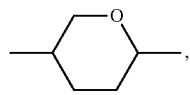

Z$^1$ denotes a single bond,
X$^1$ denotes a boronic acid ester, and
X$^2$ denotes a halogen.

18. A process according to claim 7, wherein the compound prepared is selected from the group consisting of

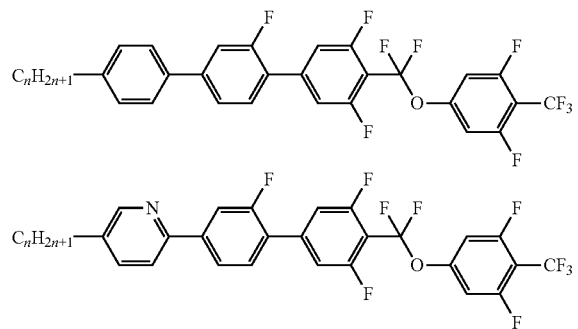

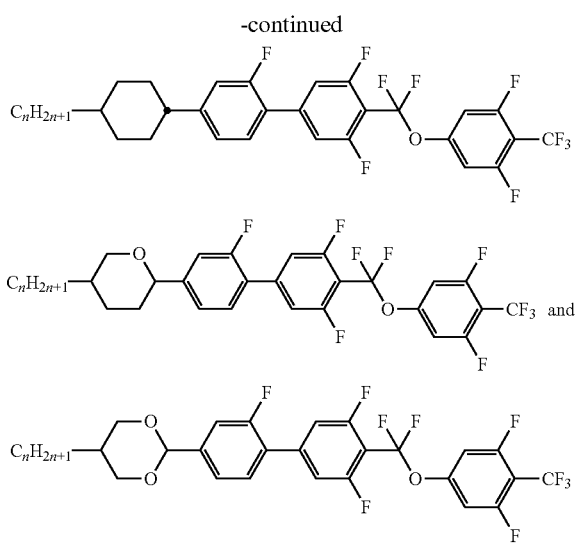

in which n=1, 2, 3, 4, 5, 6 or 7.

19. A process according to claim 7, wherein in the compound prepared
A$^1$ denotes

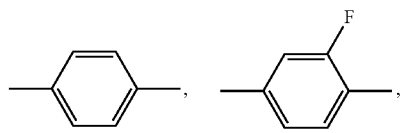

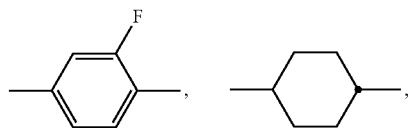

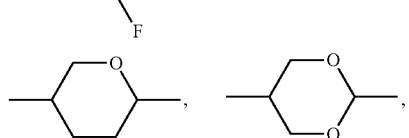

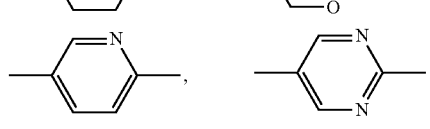

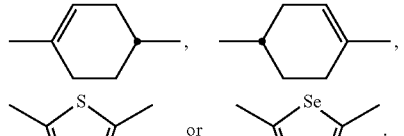

20. A compound according to claim 1, wherein
A$^1$ denotes

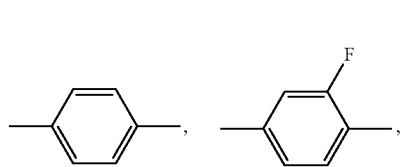

-continued

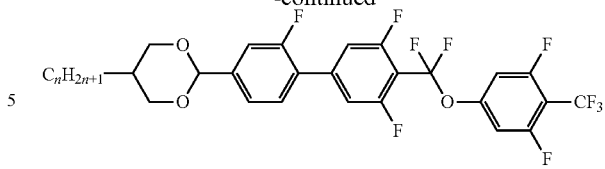

in which n=1, 2, 3, 4, 5, 6 or 7.

22. A process for preparing a compound of formula I according to claim 1, comprising reacting in the presence of a transition-metal catalyst a compound of formula A with a compound of formula B

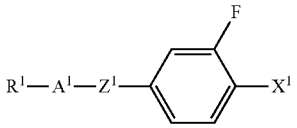

A

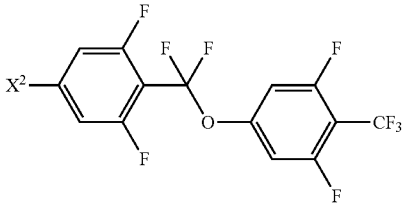

B in which $R^1$, $A^1$ and $Z^1$ are as defined for formula I, and
$X^1$ or $X^2$ denotes —$B(OH)_2$, a boronic acid ester or a boronate salt,
and the other of $X^1$ or $X^2$ denotes Cl, Br, I or —$O(SO_2)CF_3$.

* * * * *

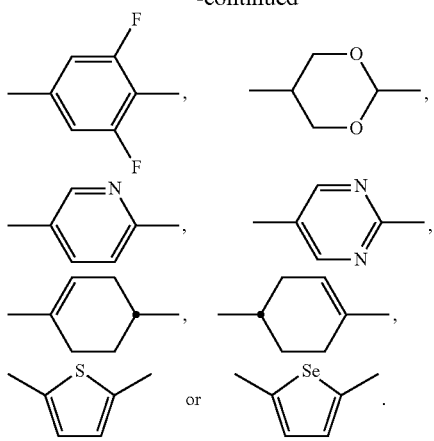

21. A compound according to claim 1, which is selected from the group consisting of

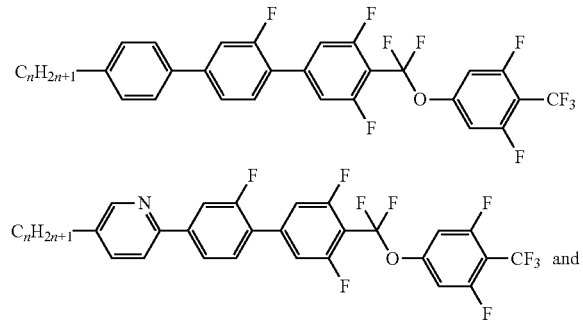

and

UNITED STATES PATENT AND TRADEMARK OFFICE
CERTIFICATE OF CORRECTION

PATENT NO. : 8,211,513 B2  
APPLICATION NO. : 13/053479  
DATED : July 3, 2012  
INVENTOR(S) : Asel Jansen et al.

Page 1 of 1

It is certified that error appears in the above-identified patent and that said Letters Patent is hereby corrected as shown below:

Column 48, line 5: Delete second structure: "  ".

Column 49, line 53 reads:

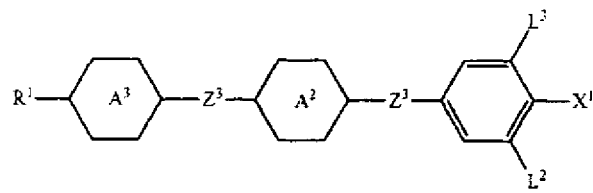

Should read:

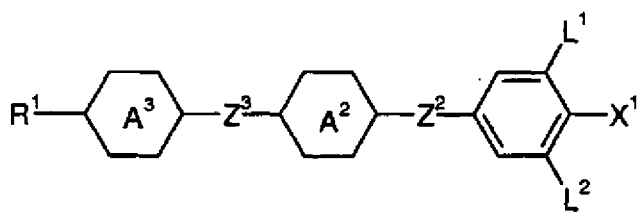

Column 50, Line 25 reads: "CFHCH$_2$, (CO)O, CH$_2$O, CEC, CH=CH, CF=CH," should read -- CFHCH$_2$, (CO)O, CH$_2$O, C≡C, CH=CH, CF=CH, --.

Column 50, Line 50: Delete second structure: "  ".

Signed and Sealed this  
Twenty-sixth Day of February, 2013

Teresa Stanek Rea  
*Acting Director of the United States Patent and Trademark Office*